United States Patent
Hamer et al.

(10) Patent No.: US 11,920,037 B2
(45) Date of Patent: Mar. 5, 2024

(54) RUBBER-CONTAINING ASPHALT COMPOSITIONS AND RELATED METHODS

(71) Applicant: BMIC LLC, Dallas, TX (US)

(72) Inventors: Ann Hamer, Waxahachie, TX (US); Steven Sparks, Midlothian, TX (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 18/167,422

(22) Filed: Feb. 10, 2023

(65) Prior Publication Data
US 2024/0010839 A1 Jan. 11, 2024

Related U.S. Application Data
(60) Provisional application No. 63/359,671, filed on Jul. 8, 2022.

(51) Int. Cl.
C08L 95/00 (2006.01)
C08L 17/00 (2006.01)
E04D 1/12 (2006.01)

(52) U.S. Cl.
CPC ............ C08L 95/00 (2013.01); C08L 17/00 (2013.01); E04D 1/12 (2013.01); C08L 2555/34 (2013.01)

(58) Field of Classification Search
CPC ............ C08L 95/00; D06N 5/00; C10C 3/00
See application file for complete search history.

(56) References Cited

U.S. PATENT DOCUMENTS

| | | | |
|---|---|---|---|
| 4,588,634 A * | 5/1986 | Pagen | D06N 5/00 524/68 |
| 8,664,303 B2 | 3/2014 | Martin | |
| 8,814,464 B2 | 8/2014 | McDade et al. | |
| 9,181,456 B2 | 11/2015 | Hong et al. | |
| 9,540,544 B2 | 1/2017 | Kalkanoglu et al. | |
| 9,605,152 B2 * | 3/2017 | Ruan | C08L 91/06 |
| 9,909,031 B1 * | 3/2018 | Bruns | C09D 153/02 |
| 9,932,477 B2 | 4/2018 | Liu et al. | |
| 10,030,145 B2 | 7/2018 | Severance et al. | |
| 10,696,868 B2 | 6/2020 | Quinn et al. | |
| 11,059,976 B2 | 7/2021 | Franzen et al. | |
| 11,473,305 B2 | 10/2022 | LaTorre et al. | |
| 11,519,137 B2 | 12/2022 | Kelley et al. | |
| 2009/0054562 A1 | 2/2009 | Martin | |
| 2012/0164385 A1 | 6/2012 | Heulings et al. | |
| 2013/0022823 A1 | 1/2013 | Franks, Sr. | |

(Continued)

OTHER PUBLICATIONS

Pauli, Adam T., Asphalt Compatibility Testing Using the Automated Heithaus Titration Test, Western Research Institute, 1996.

(Continued)

*Primary Examiner* — Alexandra M Moore
(74) *Attorney, Agent, or Firm* — GREENBERG TRAURIG, LLP

(57) ABSTRACT

Some embodiments relate to a method for producing a rubber-containing asphalt composition. The method for producing the rubber-containing asphalt composition comprises obtaining a rubber component; obtaining an unoxidized asphalt; mixing the rubber component and the unoxidized asphalt to obtain an unoxidized asphalt composition; oxidizing the unoxidized asphalt composition to obtain an oxidized asphalt composition; and forming a roofing shingle from the oxidized asphalt composition.

18 Claims, 2 Drawing Sheets

(56) References Cited

U.S. PATENT DOCUMENTS

2013/0172452 A1 7/2013 Corcoran et al.
2016/0017148 A1 1/2016 Ruan et al.
2017/0327664 A1 11/2017 Al-Mehthel et al.
2021/0108416 A1 4/2021 Aschenbeck et al.

OTHER PUBLICATIONS

Schabron, John F., et al., Asphaltene Determinator Method for Automated On-Column Precipitation and Redissolution of Pericondensed Aromatic Asphaltene Components, Energy and Fuels, 2010, 24, 5984-5996.

* cited by examiner

RUBBER-CONTAINING ASPHALT COMPOSITIONS AND RELATED METHODS

CROSS-REFERENCE TO RELATED APPLICATIONS

The present application claims priority to and benefit of U.S. Provisional Patent Application No. 63/359,671, filed Jul. 8, 2022 and entitled "RUBBER-CONTAINING ASPHALT COMPOSITIONS AND RELATED METHODS," the entirety of which is herein incorporated by reference.

FIELD

This disclosure generally relates to rubber-containing asphalt compositions and related methods.

BACKGROUND

Asphalt generally must meet minimum specifications to be useful for roofing applications. Asphalt that does not meet these minimum specifications cannot be used and is discarded as waste.

SUMMARY

Some embodiments relate to a method. In some embodiments, the method comprises obtaining a rubber component. In some embodiments, the rubber component comprises at least one of ground tire rubber, devulcanized rubber, or any combination thereof. In some embodiments, the method comprises obtaining an unoxidized asphalt. In some embodiments, the unoxidized asphalt having a penetration point of 200 dmm or greater at 77° F. as measured according to ASTM D5. In some embodiments, the method comprises mixing the rubber component and the unoxidized asphalt to obtain an unoxidized asphalt composition. In some embodiments, the method comprises oxidizing the unoxidized asphalt composition to obtain an oxidized asphalt composition. In some embodiments, the method comprises forming a roofing shingle from the oxidized asphalt composition.

In some embodiments, the rubber component comprises 1% to 99% by weight of ground tire rubber based on a total weight of the rubber component.

In some embodiments, the rubber component comprises 1% to 99% by weight of devulcanized rubber based on a total weight of the rubber component.

In some embodiments, the penetration point of the unoxidized asphalt is 200 dmm to 1000 dmm at 77° F. as measured according to ASTM D5.

In some embodiments, a softening point of the unoxidized asphalt is 85° F. to 120° F. as measured according to ASTM D36.

In some embodiments, a viscosity of the unoxidized asphalt is 1000 cP to 2000 cP as measured according to ASTM D4402 using a RV3 viscometer spindle at 50 rpm and 210° F.

In some embodiments, the unoxidized asphalt composition comprises 1% to 50% by weight of the rubber component based on a total weight of the unoxidized asphalt composition.

In some embodiments, the unoxidized asphalt composition comprises 50% to 99% by weight of the unoxidized asphalt based on a total weight of the unoxidized asphalt composition.

In some embodiments, the unoxidized asphalt and the rubber component are mixed at a temperature of 300° F. to 425° F.

In some embodiments, the unoxidized asphalt composition is oxidized at a temperature of 200° F. to 600° F.

In some embodiments, the oxidized asphalt composition has a penetration point of 15 dmm to 30 dmm at 77° F. as measured according to ASTM D5.

In some embodiments, the oxidized asphalt composition has a softening point of 180° F. to 235° F. as measured according to ASTM D36.

In some embodiments, the oxidized asphalt composition has a viscosity of 100 cP to 500 cP as measured according to ASTM D4402 using a RV3 viscometer spindle at 50 rpm and 400° F.

In some embodiments, the oxidized asphalt composition has 1% to 5% by weight of the rubber component based on a total weight of the oxidized asphalt composition.

In some embodiments, the oxidized asphalt composition comprises 95% to 99% by weight of asphalt based on a total weight of the oxidized asphalt composition.

In some embodiments, the unoxidized asphalt composition is oxidized in the absence of a catalyst.

In some embodiments, the unoxidized asphalt composition is oxidized in the absence of an acid catalyst.

In some embodiments, the unoxidized asphalt composition does not comprise a polymer.

In some embodiments, the unoxidized asphalt composition does not comprise re-refined engine oil bottoms (REOBs).

Some embodiments relate to a roofing shingle. In some embodiments, the roofing shingle comprises an oxidized asphalt composition prepared according to the methods disclosed herein.

Some embodiments relate to a method. In some embodiments, the method comprises obtaining a rubber component. In some embodiments, the rubber component comprises at least one of ground tire rubber, devulcanized rubber, or any combination thereof. In some embodiments, obtaining an unoxidized asphalt. In some embodiments, the unoxidized asphalt having a penetration point of less than 200 dmm at 77° F. as measured according to ASTM D5. In some embodiments, the method comprises mixing the rubber component and the unoxidized asphalt to obtain an unoxidized asphalt composition. In some embodiments, the method comprises oxidizing the unoxidized asphalt composition to obtain an oxidized asphalt composition. In some embodiments, the method comprises forming a roofing shingle from the oxidized asphalt composition.

In some embodiments, the rubber component comprises 1% to 99% by weight of ground tire rubber based on a total weight of the rubber component.

In some embodiments, the rubber component comprises 1% to 99% by weight of devulcanized rubber based on a total weight of the rubber component.

In some embodiments, the penetration point of the unoxidized asphalt is 1 dmm to 199 dmm at 77° F. as measured according to ASTM D5.

In some embodiments, the unoxidized asphalt composition comprises 5% to 25% by weight of the rubber component based on a total weight of the unoxidized asphalt composition.

In some embodiments, the unoxidized asphalt composition comprises 75% to 95% by weight of the unoxidized asphalt based on a total weight of the unoxidized asphalt composition.

In some embodiments, the unoxidized asphalt and the rubber component are mixed at a temperature of 300° F. to 425° F.

In some embodiments, the unoxidized asphalt composition is oxidized at a temperature of 200° F. to 600° F.

In some embodiments, the oxidized asphalt composition has a penetration point of 15 dmm to 30 dmm at 77° F. as measured according to ASTM D5.

In some embodiments, the oxidized asphalt composition has a softening point of 180° F. to 235° F. as measured according to ASTM D36.

In some embodiments, the oxidized asphalt composition has a viscosity of 100 cP to 500 cP as measured according to ASTM D4402 using a RV3 viscometer spindle at 50 rpm and 400° F.

In some embodiments, the oxidized asphalt composition has 5% to 25% by weight of the rubber component based on a total weight of the oxidized asphalt composition.

In some embodiments, the oxidized asphalt composition comprises 75% to 95% by weight of asphalt based on a total weight of the oxidized asphalt composition.

In some embodiments, the unoxidized asphalt composition is oxidized in the absence of a catalyst.

In some embodiments, the unoxidized asphalt composition is oxidized in the absence of an acid catalyst.

In some embodiments, the unoxidized asphalt composition does not comprise a polymer.

In some embodiments, the unoxidized asphalt composition does not comprise re-refined engine oil bottoms (REOBs).

Some embodiments relate to a roofing shingle. In some embodiments, the roofing shingle comprises an oxidized asphalt composition prepared according to the methods disclosed herein.

BRIEF DESCRIPTION OF THE DRAWINGS

Reference is made to the drawings that form a part of this disclosure, and which illustrate embodiments in which the materials and methods described herein can be practiced.

DETAILED DESCRIPTION

Figure 1:
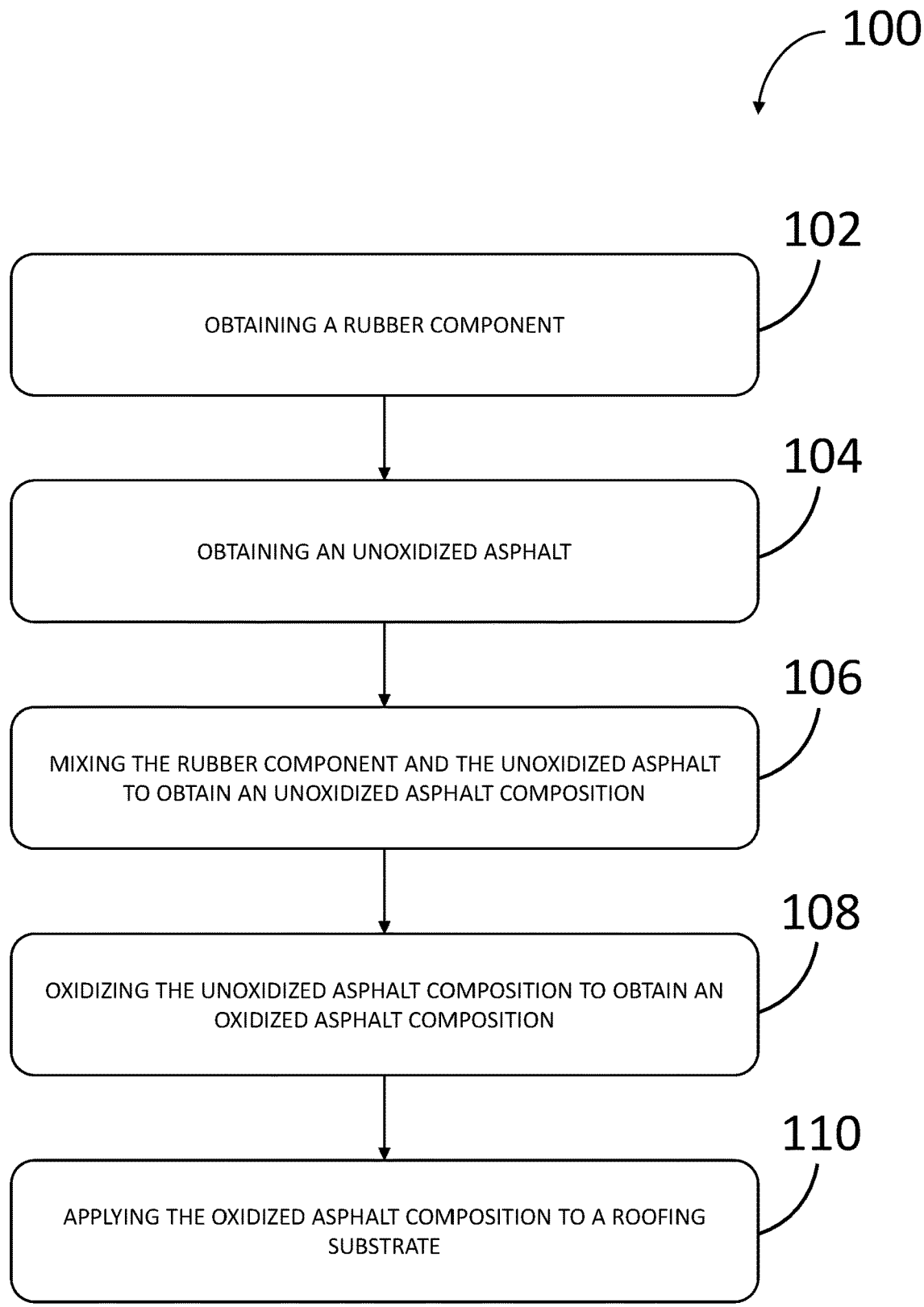
FIG. 1 is a flowchart of a method for producing an oxidized asphalt composition, according to some embodiments.

The incorporation of rubber into asphalt would expand the sources of materials available for asphalt applications. However, asphalt needs to meet certain minimum specifications to be useful for roofing applications. The differences in properties between rubber and asphalt present challenges in formulating compositions containing rubber and asphalt that meet these minimum specifications. Embodiments herein provide methods that enable the production of rubber-containing asphalt compositions that are useful for roofing applications, among others.

In some embodiments, the method comprises obtaining a rubber component.

In some embodiments, the rubber component comprises ground tire rubber (GTR).

As used herein, the term "ground tire rubber" refers to rubber derived from at least one of tires, tubes, or any combination thereof. The term "ground tire rubber" includes, for example, waste rubber and recycled rubber, which is derived from processed waste rubber. In some embodiments, the ground tire rubber comprises at least partially vulcanized waste rubber, at least partially devulcanized waste rubber, or any combination thereof.

In some embodiments, the ground tire rubber comprises at least one of synthetic rubber, natural rubber, or any combination thereof. In some embodiments, the ground tire rubber comprises recycled rubber. In some embodiments, the ground tire rubber comprises recycled rubber from tires, recycled rubber from tubes, or any combination thereof. In some embodiments, the ground tire rubber comprises at least one of a vulcanized rubber, a partially vulcanized rubber, or any combination thereof. In some embodiments, each of the vulcanized rubber and the partially vulcanized rubber independently comprises at least one of a polymer, a filler, a plasticizer, a surfactant, an elastomer, an additive, or any combination thereof. In some embodiments, each of the vulcanized rubber and the partially vulcanized rubber independently comprises at least one of the following polymers: at least one of styrene-butadiene-styrene (SBS), styrene butadiene (SBR), styrene-ethylene/butylene-styrene (SEBS), ethylene-propylene-diene, polyethylene, polyisoprene, polybutylene, polybutadiene, polychloroprene (neoprene), nitrile rubber (acrylonitrile butadiene), butyl rubber, polyacrylonitrile, or any combination thereof. In some embodiments, the chemical composition of ground tire rubber depends on the source from which the ground tire rubber is derived and thus can vary and be non-uniform.

As used herein, the term "mesh size" refers to a mean particle size of a granular material based on U.S. standard mesh sizes.

In some embodiments, the ground tire rubber comprises 4 mesh ground tire rubber to 1200 mesh ground tire rubber. In some embodiments, the ground tire rubber comprises 4 mesh ground tire rubber or less. In some embodiments, the ground tire rubber comprises 5 mesh ground tire rubber or less. In some embodiments, the ground tire rubber comprises 6 mesh ground tire rubber or less. In some embodiments, the ground tire rubber comprises 7 mesh ground tire rubber or less. In some embodiments, the ground tire rubber comprises 8 mesh ground tire rubber or less. In some embodiments, the ground tire rubber comprises 10 mesh ground tire rubber or less. In some embodiments, the ground tire rubber comprises 12 mesh ground tire rubber or less. In some embodiments, the ground tire rubber comprises 14 mesh ground tire rubber or less. In some embodiments, the ground tire rubber comprises 16 mesh ground tire rubber or less. In some embodiments, the ground tire rubber comprises 18 mesh ground tire rubber. In some embodiments, the ground tire rubber comprises 20 mesh ground tire rubber or less. In some embodiments, the ground tire rubber comprises 24 mesh ground tire rubber or less. In some embodiments, the ground tire rubber comprises 30 mesh ground tire rubber or less. In some embodiments, the ground tire rubber comprises 36 mesh ground tire rubber or less. In some embodiments, the ground tire rubber comprises 40 mesh ground tire rubber or less. In some embodiments, the ground tire rubber comprises 46 mesh ground tire rubber or less. In some embodiments, the ground tire rubber comprises 54 mesh ground tire rubber or less. In some embodiments, the ground tire rubber comprises 60 mesh ground tire rubber or less. In some embodiments, the ground tire rubber comprises 70 mesh ground tire rubber or less. In some embodiments, the ground tire rubber comprises 80 mesh ground tire rubber or less. In some embodiments, the ground tire rubber comprises 90 mesh ground tire rubber or less. In some embodiments, the ground tire rubber comprises 100 mesh ground tire rubber or less. In some embodiments, the ground tire rubber comprises 120 mesh ground tire rubber or less. In some embodiments, the ground tire rubber comprises 140 mesh ground tire rubber or less. In some embodiments, the ground tire rubber comprises 150 mesh ground tire rubber or less. In some embodiments, the ground tire rubber comprises 170 mesh ground tire rubber or less. In some embodiments, the ground tire rubber comprises 180 mesh ground tire rubber or less. In some embodiments, the ground tire rubber comprises 200 mesh ground tire rubber or less. In some embodiments, the ground tire rubber comprises 220 mesh ground tire rubber or less. In some embodiments, the ground tire rubber comprises 240 mesh ground tire rubber or less. In some embodiments, the ground tire rubber comprises 280 mesh ground tire rubber or less. In some embodiments, the ground tire rubber comprises 320 mesh ground tire rubber or less. In some embodiments, the ground tire rubber comprises 400 mesh ground tire rubber or less. In some embodiments, the ground tire rubber comprises 500 mesh ground tire rubber or less. In some embodiments, the ground tire rubber comprises 600 mesh ground tire rubber or less. In some embodiments, the ground tire rubber comprises 1000 mesh ground tire rubber or less. In some embodiments, the ground tire rubber comprises 1200 mesh ground tire rubber or less. In some embodiments, the ground tire rubber comprises any combination of the foregoing mesh sizes of ground tire rubber or less. As used herein, the term "less" when used with respect to the mesh size, refers to smaller mesh sizes.

In some embodiments, the rubber component comprises 1% to 99% by weight of the ground tire rubber based on a total weight of the rubber component. In some embodiments, the rubber component comprises 5% to 99% by weight of the ground tire rubber based on the total weight of the rubber component. In some embodiments, the rubber component comprises 10% to 99% by weight of the ground tire rubber based on the total weight of the rubber component. In some embodiments, the rubber component comprises 15% to 99% by weight of the ground tire rubber based on the total weight of the rubber component. In some embodiments, the rubber component comprises 20% to 99% by weight of the ground tire rubber based on the total weight of the rubber component. In some embodiments, the rubber component comprises 25% to 99% by weight of the ground tire rubber based on the total weight of the rubber component. In some embodiments, the rubber component comprises 30% to 99% by weight of the ground tire rubber based on the total weight of the rubber component. In some embodiments, the rubber component comprises 35% to 99% by weight of the ground tire rubber based on the total weight of the rubber component. In some embodiments, the rubber component comprises 40% to 99% by weight of the ground tire rubber based on the total weight of the rubber component. In some embodiments, the rubber component comprises 45% to 99% by weight of the ground tire rubber based on the total weight of the rubber component. In some embodiments, the rubber component comprises 50% to 99% by weight of the ground tire rubber based on the total weight of the rubber component. In some embodiments, the rubber component comprises 55% to 99% by weight of the ground tire rubber based on the total weight of the rubber component. In some embodiments, the rubber component comprises 60% to 99% by weight of the ground tire rubber based on the total weight of the rubber component. In some embodiments, the rubber component comprises 65% to 99% by weight of the ground tire rubber based on the total weight of the rubber component. In some embodiments, the rubber component comprises 70% to 99% by weight of the ground tire rubber based on the total weight of the rubber component. In some embodiments, the rubber component comprises 75% to 99% by weight of the ground tire rubber based on the total weight of the rubber component. In some embodiments, the rubber component comprises 80% to 99% by weight of the ground tire rubber based on the total weight of the rubber component. In some embodiments, the rubber component comprises 85% to 99% by weight of the ground tire rubber based on the total weight of the rubber component. In some embodiments, the rubber component comprises 90% to 99% by weight of the ground tire rubber based on the total weight of the rubber component. In some embodiments, the rubber component comprises 95% to 99% by weight of the ground tire rubber based on the total weight of the rubber component.

In some embodiments, the rubber component comprises 1% to 95% by weight of the ground tire rubber based on the total weight of the rubber component. In some embodiments, the rubber component comprises 1% to 90% by weight of the ground tire rubber based on the total weight of the rubber component. In some embodiments, the rubber component comprises 1% to 85% by weight of the ground tire rubber based on the total weight of the rubber component. In some embodiments, the rubber component comprises 1% to 80% by weight of the ground tire rubber based on the total weight of the rubber component. In some embodiments, the rubber component comprises 1% to 75% by weight of the ground tire rubber based on the total weight of the rubber component. In some embodiments, the rubber component comprises 1% to 70% by weight of the ground tire rubber based on the total weight of the rubber component. In some embodiments, the rubber component comprises 1% to 65% by weight of the ground tire rubber based on the total weight of the rubber component. In some embodiments, the rubber component comprises 1% to 60% by weight of the ground tire rubber based on the total weight of the rubber component. In some embodiments, the rubber component comprises 1% to 55% by weight of the ground tire rubber based on the total weight of the rubber component. In some embodiments, the rubber component comprises 1% to 50% by weight of the ground tire rubber based on the total weight of the rubber component. In some embodiments, the rubber component comprises 1% to 45% by weight of the ground tire rubber based on the total weight of the rubber component. In some embodiments, the rubber component comprises 1% to 40% by weight of the ground tire rubber based on the total weight of the rubber component. In some embodiments, the rubber component comprises 1% to 35% by weight of the ground tire rubber based on the total weight of the rubber component. In some embodiments, the rubber component comprises 1% to 30% by weight of the ground tire rubber based on the total weight of the rubber component. In some embodiments, the rubber component comprises 1% to 25% by weight of the ground tire rubber based on the total weight of the rubber component. In some embodiments, the rubber component comprises 1% to 20% by weight of the ground tire rubber based on the total weight of the rubber component. In some embodiments, the rubber component comprises 1% to 15% by weight of the ground tire rubber based on the total weight of the rubber component. In some embodiments, the rubber component comprises 1% to 10% by weight of the ground tire rubber based on the total weight of the rubber component. In some embodiments, the rubber component comprises 1% to 5% by weight of the ground tire rubber based on the total weight of the rubber component.

In some embodiments, the rubber component comprises devulcanized rubber.

As used herein, the term "devulcanized rubber" refers to a rubber in which at least one sulfur-sulfur (S—S) chemical bond and at least one carbon-sulfur (C—S) chemical bond is broken or severed. In some embodiments, the term can further refer to rubbers in which at least one S—S chemical bond and at least one C—S chemical bond is broken, while maintaining at least a portion of a polymer network (e.g., a polymer backbone), without degrading the material (e.g., in terms of material properties).

In some embodiments, the rubber component comprises 1% to 99% by weight of the devulcanized rubber based on the total weight of the rubber component. In some embodiments, the rubber component comprises 5% to 99% by weight of the devulcanized rubber based on the total weight of the rubber component. In some embodiments, the rubber component comprises 10% to 99% by weight of the devulcanized rubber based on the total weight of the rubber component. In some embodiments, the rubber component comprises 15% to 99% by weight of the devulcanized rubber based on the total weight of the rubber component. In some embodiments, the rubber component comprises 20% to 99% by weight of the devulcanized rubber based on the total weight of the rubber component. In some embodiments, the rubber component comprises 25% to 99% by weight of the devulcanized rubber based on the total weight of the rubber component. In some embodiments, the rubber component comprises 30% to 99% by weight of the devulcanized rubber based on the total weight of the rubber component. In some embodiments, the rubber component comprises 35% to 99% by weight of the devulcanized rubber based on the total weight of the rubber component. In some embodiments, the rubber component comprises 40% to 99% by weight of the devulcanized rubber based on the total weight of the rubber component. In some embodiments, the rubber component comprises 45% to 99% by weight of the devulcanized rubber based on the total weight of the rubber component. In some embodiments, the rubber component comprises 50% to 99% by weight of the devulcanized rubber based on the total weight of the rubber component. In some embodiments, the rubber component comprises 55% to 99% by weight of the devulcanized rubber based on the total weight of the rubber component. In some embodiments, the rubber component comprises 60% to 99% by weight of the devulcanized rubber based on the total weight of the rubber component. In some embodiments, the rubber component comprises 65% to 99% by weight of the devulcanized rubber based on the total weight of the rubber component. In some embodiments, the rubber component comprises 70% to 99% by weight of the devulcanized rubber based on the total weight of the rubber component. In some embodiments, the rubber component comprises 75% to 99% by weight of the devulcanized rubber based on the total weight of the rubber component. In some embodiments, the rubber component comprises 80% to 99% by weight of the devulcanized rubber based on the total weight of the rubber component. In some embodiments, the rubber component comprises 85% to 99% by weight of the devulcanized rubber based on the total weight of the rubber component. In some embodiments, the rubber component comprises 90% to 99% by weight of the devulcanized rubber based on the total weight of the rubber component. In some embodiments, the rubber component comprises 95% to 99% by weight of the devulcanized rubber based on the total weight of the rubber component.

In some embodiments, the rubber component comprises 1% to 95% by weight of the devulcanized rubber based on the total weight of the rubber component. In some embodiments, the rubber component comprises 1% to 90% by weight of the devulcanized rubber based on the total weight of the rubber component. In some embodiments, the rubber component comprises 1% to 85% by weight of the devulcanized rubber based on the total weight of the rubber component. In some embodiments, the rubber component comprises 1% to 80% by weight of the devulcanized rubber based on the total weight of the rubber component. In some embodiments, the rubber component comprises 1% to 75% by weight of the devulcanized rubber based on the total weight of the rubber component. In some embodiments, the rubber component comprises 1% to 70% by weight of the devulcanized rubber based on the total weight of the rubber component. In some embodiments, the rubber component comprises 1% to 65% by weight of the devulcanized rubber based on the total weight of the rubber component. In some embodiments, the rubber component comprises 1% to 60% by weight of the devulcanized rubber based on the total weight of the rubber component. In some embodiments, the rubber component comprises 1% to 55% by weight of the devulcanized rubber based on the total weight of the rubber component. In some embodiments, the rubber component comprises 1% to 50% by weight of the devulcanized rubber based on the total weight of the rubber component. In some embodiments, the rubber component comprises 1% to 45% by weight of the devulcanized rubber based on the total weight of the rubber component. In some embodiments, the rubber component comprises 1% to 40% by weight of the devulcanized rubber based on the total weight of the rubber component. In some embodiments, the rubber component comprises 1% to 35% by weight of the devulcanized rubber based on the total weight of the rubber component. In some embodiments, the rubber component comprises 1% to 30% by weight of the devulcanized rubber based on the total weight of the rubber component. In some embodiments, the rubber component comprises 1% to 25% by weight of the devulcanized rubber based on the total weight of the rubber component. In some embodiments, the rubber component comprises 1% to 20% by weight of the devulcanized rubber based on the total weight of the rubber component. In some embodiments, the rubber component comprises 1% to 15% by weight of the devulcanized rubber based on the total weight of the rubber component. In some embodiments, the rubber component comprises 1% to 10% by weight of the devulcanized rubber based on the total weight of the rubber component. In some embodiments, the rubber component comprises 1% to 5% by weight of the devulcanized rubber based on the total weight of the rubber component.

In some embodiments, a weight ratio of the ground tire rubber to the devulcanized rubber is 1:5 to 5:1. In some embodiments, the weight ratio of the ground tire rubber to the devulcanized rubber is 1:4 to 4:1. In some embodiments, the weight ratio of the ground tire rubber to the devulcanized rubber is 1:3 to 3:1. In some embodiments, the weight ratio of the ground tire rubber to the devulcanized rubber is 1:2 to 2:1. In some embodiments, the weight ratio of the ground tire rubber to the devulcanized rubber is 1:1 to 1:1.

In some embodiments, the method comprises obtaining an unoxidized asphalt.

As used herein, the term "unoxidized asphalt" refers to an asphalt substance that has not been subjected to oxidation. In some embodiments, an unoxidized asphalt is an asphalt substance which has not been subjected to oxidation via an air blowing process. In some embodiments, an unoxidized asphalt is an asphalt substance which has not been subjected to oxidation via an aging process. In some embodiments, an unoxidized asphalt is an asphalt substance which has not been subjected to oxidation via an air blowing process and via an aging process.

As used herein, the term "penetration point" or "pen" refers to a vertical distance penetrated by a point of a standard needle into a material under specific conditions of load, time, and temperature. In some embodiments, a penetration point is measured at 77° F. according to ASTM D5.

In some embodiments, the unoxidized asphalt has a penetration point of less than 200 dmm at 77° F. as measured according to ASTM D5. In some embodiments, the unoxidized asphalt has a penetration point of less than 190 dmm at 77° F. as measured according to ASTM D5. In some embodiments, the unoxidized asphalt has a penetration point of less than 180 dmm at 77° F. as measured according to ASTM D5. In some embodiments, the unoxidized asphalt has a penetration point of less than 170 dmm at 77° F. as measured according to ASTM D5. In some embodiments, the unoxidized asphalt has a penetration point of less than 160 dmm at 77° F. as measured according to ASTM D5. In some embodiments, the unoxidized asphalt has a penetration point of less than 150 dmm at 77° F. as measured according to ASTM D5. In some embodiments, the unoxidized asphalt has a penetration point of less than 140 dmm at 77° F. as measured according to ASTM D5. In some embodiments, the unoxidized asphalt has a penetration point of less than 130 dmm at 77° F. as measured according to ASTM D5. In some embodiments, the unoxidized asphalt has a penetration point of less than 120 dmm at 77° F. as measured according to ASTM D5. In some embodiments, the unoxidized asphalt has a penetration point of less than 110 dmm at 77° F. as measured according to ASTM D5. In some embodiments, the unoxidized asphalt has a penetration point of less than 100 dmm at 77° F. as measured according to ASTM D5. In some embodiments, the unoxidized asphalt has a penetration point of less than 90 dmm at 77° F. as measured according to ASTM D5. In some embodiments, the unoxidized asphalt has a penetration point of less than 80 dmm at 77° F. as measured according to ASTM D5. In some embodiments, the unoxidized asphalt has a penetration point of less than 70 dmm at 77° F. as measured according to ASTM D5. In some embodiments, the unoxidized asphalt has a penetration point of less than 60 dmm at 77° F. as measured according to ASTM D5. In some embodiments, the unoxidized asphalt has a penetration point of less than 50 dmm at 77° F. as measured according to ASTM D5. In some embodiments, the unoxidized asphalt has a penetration point of less than 40 dmm at 77° F. as measured according to ASTM D5. In some embodiments, the unoxidized asphalt has a penetration point of less than 30 dmm at 77° F. as measured according to ASTM D5. In some embodiments, the unoxidized asphalt has a penetration point of less than 25 dmm at 77° F. as measured according to ASTM D5. In some embodiments, the unoxidized asphalt has a penetration point of less than 20 dmm at 77° F. as measured according to ASTM D5. In some embodiments, the unoxidized asphalt has a penetration point of less than 15 dmm at 77° F. as measured according to ASTM D5. In some embodiments, the unoxidized asphalt has a penetration point of less than 14 dmm at 77° F. as measured according to ASTM D5. In some embodiments, the unoxidized asphalt has a penetration point of less than 13 dmm at 77° F. as measured according to ASTM D5. In some embodiments, the unoxidized asphalt has a penetration point of less than 12 dmm at 77° F. as measured according to ASTM D5. In some embodiments, the unoxidized asphalt has a penetration point of less than 11 dmm at 77° F. as measured according to ASTM D5. In some embodiments, the unoxidized asphalt has a penetration point of less than 10 dmm at 77° F. as measured according to ASTM D5. In some embodiments, the unoxidized asphalt has a penetration point of less than 9 dmm at 77° F. as measured according to ASTM D5. In some embodiments, the unoxidized asphalt has a penetration point of less than 8 dmm at 77° F. as measured according to ASTM D5. In some embodiments, the unoxidized asphalt has a penetration point of less than 7 dmm at 77° F. as measured according to ASTM D5. In some embodiments, the unoxidized asphalt has a penetration point of less than 6 dmm at 77° F. as measured according to ASTM D5. In some embodiments, the unoxidized asphalt has a penetration point of less than 5 dmm at 77° F. as measured according to ASTM D5. In some embodiments, the unoxidized asphalt has a penetration point of less than 4 dmm at 77° F. as measured according to ASTM D5. In some embodiments, the unoxidized asphalt has a penetration point of less than 3 dmm at 77° F. as measured according to ASTM D5. In some embodiments, the unoxidized asphalt has a penetration point of less than 2 dmm at 77° F. as measured according to ASTM D5.

In some embodiments, the unoxidized asphalt has a penetration point of 1 dmm to 199 dmm at 77° F. as measured according to ASTM D5. In some embodiments, the unoxidized asphalt has a penetration point of 1 dmm to 190 dmm at 77° F. as measured according to ASTM D5. In some embodiments, the unoxidized asphalt has a penetration point of 1 dmm to 180 dmm at 77° F. as measured according to ASTM D5. In some embodiments, the unoxidized asphalt has a penetration point of 1 dmm to 170 dmm at 77° F. as measured according to ASTM D5. In some embodiments, the unoxidized asphalt has a penetration point of 1 dmm to 160 dmm at 77° F. as measured according to ASTM D5. In some embodiments, the unoxidized asphalt has a penetration point of 1 dmm to 150 dmm at 77° F. as measured according to ASTM D5. In some embodiments, the unoxidized asphalt has a penetration point of 1 dmm to 140 dmm at 77° F. as measured according to ASTM D5. In some embodiments, the unoxidized asphalt has a penetration point of 1 dmm to 130 dmm at 77° F. as measured according to ASTM D5. In some embodiments, the unoxidized asphalt has a penetration point of 1 dmm to 120 dmm at 77° F. as measured according to ASTM D5. In some embodiments, the unoxidized asphalt has a penetration point of 1 dmm to 110 dmm at 77° F. as measured according to ASTM D5. In some embodiments, the unoxidized asphalt has a penetration point of 1 dmm to 100 dmm at 77° F. as measured according to ASTM D5. In some embodiments, the unoxidized asphalt has a penetration point of 1 dmm to 90 dmm at 77° F. as measured according to ASTM D5. In some embodiments, the unoxidized asphalt has a penetration point of 1 dmm to 80 dmm at 77° F. as measured according to ASTM D5. In some embodiments, the unoxidized asphalt has a penetration point of 1 dmm to 70 dmm at 77° F. as measured according to ASTM D5. In some embodiments, the unoxidized asphalt has a penetration point of 1 dmm to 60 dmm at 77° F. as measured according to ASTM D5. In some embodiments, the unoxidized asphalt has a penetration point of 1 dmm to 50 dmm at 77° F. as measured according to ASTM D5. In some embodiments, the unoxidized asphalt has a penetration point of 1 dmm to 40 dmm at 77° F. as measured according to ASTM D5. In some embodiments, the unoxidized asphalt has a penetration point of 1 dmm to 30 dmm at 77° F. as measured according to ASTM D5. In some embodiments, the unoxidized asphalt has a penetration point of 1 dmm to 25 dmm at 77° F. as measured according to ASTM D5. In some embodiments, the unoxidized asphalt has a penetration point of 1 dmm to 20 dmm at 77° F. as measured according to ASTM D5. In some embodiments, the unoxidized asphalt has a penetration point of 1 dmm to 15 dmm at 77° F. as measured according to ASTM D5.

In some embodiments, the unoxidized asphalt has a penetration point of 5 dmm to 199 dmm at 77° F. as measured according to ASTM D5. In some embodiments, the unoxidized asphalt has a penetration point of 10 dmm to 199 dmm at 77° F. as measured according to ASTM D5. In some embodiments, the unoxidized asphalt has a penetration point of 15 dmm to 199 dmm at 77° F. as measured according to ASTM D5. In some embodiments, the unoxidized asphalt has a penetration point of 20 dmm to 199 dmm at 77° F. as measured according to ASTM D5. In some embodiments, the unoxidized asphalt has a penetration point of 25 dmm to 199 dmm at 77° F. as measured according to ASTM D5. In some embodiments, the unoxidized asphalt has a penetration point of 30 dmm to 199 dmm at 77° F. as measured according to ASTM D5. In some embodiments, the unoxidized asphalt has a penetration point of 40 dmm to 199 dmm at 77° F. as measured according to ASTM D5. In some embodiments, the unoxidized asphalt has a penetration point of 50 dmm to 199 dmm at 77° F. as measured according to ASTM D5. In some embodiments, the unoxidized asphalt has a penetration point of 60 dmm to 199 dmm at 77° F. as measured according to ASTM D5. In some embodiments, the unoxidized asphalt has a penetration point of 70 dmm to 199 dmm at 77° F. as measured according to ASTM D5. In some embodiments, the unoxidized asphalt has a penetration point of 80 dmm to 199 dmm at 77° F. as measured according to ASTM D5. In some embodiments, the unoxidized asphalt has a penetration point of 90 dmm to 199 dmm at 77° F. as measured according to ASTM D5. In some embodiments, the unoxidized asphalt has a penetration point of 100 dmm to 199 dmm at 77° F. as measured according to ASTM D5. In some embodiments, the unoxidized asphalt has a penetration point of 110 dmm to 199 dmm at 77° F. as measured according to ASTM D5. In some embodiments, the unoxidized asphalt has a penetration point of 120 dmm to 199 dmm at 77° F. as measured according to ASTM D5. In some embodiments, the unoxidized asphalt has a penetration point of 130 dmm to 199 dmm at 77° F. as measured according to ASTM D5. In some embodiments, the unoxidized asphalt has a penetration point of 140 dmm to 199 dmm at 77° F. as measured according to ASTM D5. In some embodiments, the unoxidized asphalt has a penetration point of 150 dmm to 199 dmm at 77° F. as measured according to ASTM D5. In some embodiments, the unoxidized asphalt has a penetration point of 160 dmm to 199 dmm at 77° F. as measured according to ASTM D5. In some embodiments, the unoxidized asphalt has a penetration point of 170 dmm to 199 dmm at 77° F. as measured according to ASTM D5. In some embodiments, the unoxidized asphalt has a penetration point of 180 dmm to 199 dmm at 77° F. as measured according to ASTM D5. In some embodiments, the unoxidized asphalt has a penetration point of 190 dmm to 199 dmm at 77° F. as measured according to ASTM D5.

In some embodiments, the unoxidized asphalt has a penetration point of 1 dmm to 15 dmm at 77° F. as measured according to ASTM D5. In some embodiments, the unoxidized asphalt has a penetration point of 1 dmm to 14 dmm at 77° F. as measured according to ASTM D5. In some embodiments, the unoxidized asphalt has a penetration point of 1 dmm to 13 dmm at 77° F. as measured according to ASTM D5. In some embodiments, the unoxidized asphalt has a penetration point of 1 dmm to 12 dmm at 77° F. as measured according to ASTM D5. In some embodiments, the unoxidized asphalt has a penetration point of 1 dmm to 11 dmm at 77° F. as measured according to ASTM D5. In some embodiments, the unoxidized asphalt has a penetration point of 1 dmm to 10 dmm at 77° F. as measured according to ASTM D5. In some embodiments, the unoxidized asphalt has a penetration point of 1 dmm to 9 dmm at 77° F. as measured according to ASTM D5. In some embodiments, the unoxidized asphalt has a penetration point of 1 dmm to 8 dmm at 77° F. as measured according to ASTM D5. In some embodiments, the unoxidized asphalt has a penetration point of 1 dmm to 7 dmm at 77° F. as measured according to ASTM D5. In some embodiments, the unoxidized asphalt has a penetration point of 1 dmm to 6 dmm at 77° F. as measured according to ASTM D5. In some embodiments, the unoxidized asphalt has a penetration point of 1 dmm to 5 dmm at 77° F. as measured according to ASTM D5. In some embodiments, the unoxidized asphalt has a penetration point of 1 dmm to 4 dmm at 77° F. as measured according to ASTM D5. In some embodiments, the unoxidized asphalt has a penetration point of 1 dmm to 3 dmm at 77° F. as measured according to ASTM D5.

In some embodiments, the unoxidized asphalt has a penetration point of 2 dmm to 15 dmm at 77° F. as measured according to ASTM D5. In some embodiments, the unoxidized asphalt has a penetration point of 3 dmm to 15 dmm at 77° F. as measured according to ASTM D5. In some embodiments, the unoxidized asphalt has a penetration point of 4 dmm to 15 dmm at 77° F. as measured according to ASTM D5. In some embodiments, the unoxidized asphalt has a penetration point of 5 dmm to 15 dmm at 77° F. as measured according to ASTM D5. In some embodiments, the unoxidized asphalt has a penetration point of 6 dmm to 15 dmm at 77° F. as measured according to ASTM D5. In some embodiments, the unoxidized asphalt has a penetration point of 7 dmm to 15 dmm at 77° F. as measured according to ASTM D5. In some embodiments, the unoxidized asphalt has a penetration point of 8 dmm to 15 dmm at 77° F. as measured according to ASTM D5. In some embodiments, the unoxidized asphalt has a penetration point of 9 dmm to 15 dmm at 77° F. as measured according to ASTM D5. In some embodiments, the unoxidized asphalt has a penetration point of 10 dmm to 15 dmm at 77° F. as measured according to ASTM D5. In some embodiments, the unoxidized asphalt has a penetration point of 11 dmm to 15 dmm at 77° F. as measured according to ASTM D5. In some embodiments, the unoxidized asphalt has a penetration point of 12 dmm to 15 dmm at 77° F. as measured according to ASTM D5. In some embodiments, the unoxidized asphalt has a penetration point of 13 dmm to 15 dmm at 77° F. as measured according to ASTM D5.

In some embodiments, the unoxidized asphalt has a penetration point of 200 dmm or greater at 77° F. as measured according to ASTM D5. In some embodiments, the unoxidized asphalt has a penetration point of 250 dmm or greater at 77° F. as measured according to ASTM D5. In some embodiments, the unoxidized asphalt has a penetration point of 300 dmm or greater at 77° F. as measured according to ASTM D5. In some embodiments, the unoxidized asphalt has a penetration point of 350 dmm or greater at 77° F. as measured according to ASTM D5. In some embodiments, the unoxidized asphalt has a penetration point of 400 dmm or greater at 77° F. as measured according to ASTM D5. In some embodiments, the unoxidized asphalt has a penetration point of 450 dmm or greater at 77° F. as measured according to ASTM D5. In some embodiments, the unoxidized asphalt has a penetration point of 500 dmm or greater at 77° F. as measured according to ASTM D5. In some embodiments, the unoxidized asphalt has a penetration point of 550 dmm or greater at 77° F. as measured according to ASTM D5. In some embodiments, the unoxidized asphalt has a penetration point of 600 dmm or greater at 77° F. as measured according to ASTM D5. In some embodiments, the unoxidized asphalt has a penetration point of 650 dmm or greater at 77° F. as measured according to ASTM D5. In some embodiments, the unoxidized asphalt has a penetration point of 700 dmm or greater at 77° F. as measured according to ASTM D5. In some embodiments, the unoxidized asphalt has a penetration point of 750 dmm or greater at 77° F. as measured according to ASTM D5. In some embodiments, the unoxidized asphalt has a penetration point of 800 dmm or greater at 77° F. as measured according to ASTM D5. In some embodiments, the unoxidized asphalt has a penetration point of 850 dmm or greater at 77° F. as measured according to ASTM D5. In some embodiments, the unoxidized asphalt has a penetration point of 900 dmm or greater at 77° F. as measured according to ASTM D5. In some embodiments, the unoxidized asphalt has a penetration point of 950 dmm or greater at 77° F. as measured according to ASTM D5. In some embodiments, the unoxidized asphalt has a penetration point of 1000 dmm or greater at 77° F. as measured according to ASTM D5.

In some embodiments, the unoxidized asphalt has a penetration point of 200 dmm to 1000 dmm at 77° F. as measured according to ASTM D5. In some embodiments, the unoxidized asphalt has a penetration point of 250 dmm to 1000 dmm at 77° F. as measured according to ASTM D5. In some embodiments, the unoxidized asphalt has a penetration point of 300 dmm to 1000 dmm at 77° F. as measured according to ASTM D5. In some embodiments, the unoxidized asphalt has a penetration point of 350 dmm to 1000 dmm at 77° F. as measured according to ASTM D5. In some embodiments, the unoxidized asphalt has a penetration point of 400 dmm to 1000 dmm at 77° F. as measured according to ASTM D5. In some embodiments, the unoxidized asphalt has a penetration point of 450 dmm to 1000 dmm at 77° F. as measured according to ASTM D5. In some embodiments, the unoxidized asphalt has a penetration point of 500 dmm to 1000 dmm at 77° F. as measured according to ASTM D5. In some embodiments, the unoxidized asphalt has a penetration point of 550 dmm to 1000 dmm at 77° F. as measured according to ASTM D5. In some embodiments, the unoxidized asphalt has a penetration point of 600 dmm to 1000 dmm at 77° F. as measured according to ASTM D5. In some embodiments, the unoxidized asphalt has a penetration point of 650 dmm to 1000 dmm at 77° F. as measured according to ASTM D5. In some embodiments, the unoxidized asphalt has a penetration point of 700 dmm to 1000 dmm at 77° F. as measured according to ASTM D5. In some embodiments, the unoxidized asphalt has a penetration point of 750 dmm to 1000 dmm at 77° F. as measured according to ASTM D5. In some embodiments, the unoxidized asphalt has a penetration point of 800 dmm to 1000 dmm at 77° F. as measured according to ASTM D5. In some embodiments, the unoxidized asphalt has a penetration point of 850 dmm to 1000 dmm at 77° F. as measured according to ASTM D5. In some embodiments, the unoxidized asphalt has a penetration point of 900 dmm to 1000 dmm at 77° F. as measured according to ASTM D5. In some embodiments, the unoxidized asphalt has a penetration point of 950 dmm to 1000 dmm at 77° F. as measured according to ASTM D5.

In some embodiments, the unoxidized asphalt has a penetration point of 200 dmm to 950 dmm at 77° F. as measured according to ASTM D5. In some embodiments, the unoxidized asphalt has a penetration point of 200 dmm to 900 dmm at 77° F. as measured according to ASTM D5. In some embodiments, the unoxidized asphalt has a penetration point of 200 dmm to 850 dmm at 77° F. as measured according to ASTM D5. In some embodiments, the unoxidized asphalt has a penetration point of 200 dmm to 800 dmm at 77° F. as measured according to ASTM D5. In some embodiments, the unoxidized asphalt has a penetration point of 200 dmm to 750 dmm at 77° F. as measured according to ASTM D5. In some embodiments, the unoxidized asphalt has a penetration point of 200 dmm to dmm at 77° F. as measured according to ASTM D5. In some embodiments, the unoxidized asphalt has a penetration point of 200 dmm to 700 dmm at 77° F. as measured according to ASTM D5. In some embodiments, the unoxidized asphalt has a penetration point of 200 dmm to 650 dmm at 77° F. as measured according to ASTM D5. In some embodiments, the unoxidized asphalt has a penetration point of 200 dmm to 600 dmm at 77° F. as measured according to ASTM D5. In some embodiments, the unoxidized asphalt has a penetration point of 200 dmm to 550 dmm at 77° F. as measured according to ASTM D5. In some embodiments, the unoxidized asphalt has a penetration point of 200 dmm to 500 dmm at 77° F. as measured according to ASTM D5. In some embodiments, the unoxidized asphalt has a penetration point of 200 dmm to 450 dmm at 77° F. as measured according to ASTM D5. In some embodiments, the unoxidized asphalt has a penetration point of 200 dmm to 400 dmm at 77° F. as measured according to ASTM D5. In some embodiments, the unoxidized asphalt has a penetration point of 200 dmm to 350 dmm at 77° F. as measured according to ASTM D5. In some embodiments, the unoxidized asphalt has a penetration point of 200 dmm to 300 dmm at 77° F. as measured according to ASTM D5. In some embodiments, the unoxidized asphalt has a penetration point of 200 dmm to 250 dmm at 77° F. as measured according to ASTM D5.

As used herein, the term "softening point" refers to a temperature at which a material softens beyond a predetermined reference softness. In some embodiments, a softening point is measured according to ASTM D36.

In some embodiments, the unoxidized asphalt has a softening point of no greater than 120° F. as measured according to ASTM D36. In some embodiments, the unoxidized asphalt has a softening point of no greater than 115° F. as measured according to ASTM D36. In some embodiments, the unoxidized asphalt has a softening point of no greater than 110° F. as measured according to ASTM D36. In some embodiments, the unoxidized asphalt has a softening point of no greater than 105° F. as measured according to ASTM D36. In some embodiments, the unoxidized asphalt has a softening point of no greater than 100° F. as measured according to ASTM D36. In some embodiments, the unoxidized asphalt has a softening point of no greater than 95° F. as measured according to ASTM D36. In some embodiments, the unoxidized asphalt has a softening point of no greater than 90° F. as measured according to ASTM D36. In some embodiments, the unoxidized asphalt has a softening point of no greater than 85° F. as measured according to ASTM D36. In some embodiments, the unoxidized asphalt has a softening point of no greater than 80° F. as measured according to ASTM D36.

In some embodiments, the unoxidized asphalt has a softening point of 80° F. to 120° F. as measured according to ASTM D36. In some embodiments, the unoxidized asphalt has a softening point of 80° F. to 115° F. as measured according to ASTM D36. In some embodiments, the unoxidized asphalt has a softening point of 80° F. to 110° F. as measured according to ASTM D36. In some embodiments, the unoxidized asphalt has a softening point of 80° F. to 105° F. as measured according to ASTM D36. In some embodiments, the unoxidized asphalt has a softening point of 80° F. to 100° F. as measured according to ASTM D36. In some embodiments, the unoxidized asphalt has a softening point of 80° F. to 95° F. as measured according to ASTM D36. In some embodiments, the unoxidized asphalt has a softening point of 80° F. to 90° F. as measured according to ASTM D36. In some embodiments, the unoxidized asphalt has a softening point of 80° F. to 85° F. as measured according to ASTM D36.

In some embodiments, the unoxidized asphalt has a softening point of 85° F. to 120° F. as measured according to ASTM D36. In some embodiments, the unoxidized asphalt has a softening point of 90° F. to 120° F. as measured according to ASTM D36. In some embodiments, the unoxidized asphalt has a softening point of 95° F. to 120° F. as measured according to ASTM D36. In some embodiments, the unoxidized asphalt has a softening point of 100° F. to 120° F. as measured according to ASTM D36. In some embodiments, the unoxidized asphalt has a softening point of 105° F. to 120° F. as measured according to ASTM D36. In some embodiments, the unoxidized asphalt has a softening point of 110° F. to 120° F. as measured according to ASTM D36. In some embodiments, the unoxidized asphalt has a softening point of 115° F. to 120° F. as measured according to ASTM D36.

In some embodiments, the unoxidized asphalt has a viscosity of 1000 cP to 2000 cP as measured according to ASTM D4402 using a RV3 viscometer spindle at 50 rpm and 210° F. In some embodiments, the unoxidized asphalt has a viscosity of 1000 cP to 1950 cP as measured according to ASTM D4402 using a RV3 viscometer spindle at 50 rpm and 210° F. In some embodiments, the unoxidized asphalt has a viscosity of 1000 cP to 1900 cP as measured according to ASTM D4402 using a RV3 viscometer spindle at 50 rpm and 210° F. In some embodiments, the unoxidized asphalt has a viscosity of 1000 cP to 1850 cP as measured according to ASTM D4402 using a RV3 viscometer spindle at 50 rpm and 210° F. In some embodiments, the unoxidized asphalt has a viscosity of 1000 cP to 1800 cP as measured according to ASTM D4402 using a RV3 viscometer spindle at 50 rpm and 210° F. In some embodiments, the unoxidized asphalt has a viscosity of 1000 cP to 1750 cP as measured according to ASTM D4402 using a RV3 viscometer spindle at 50 rpm and 210° F. In some embodiments, the unoxidized asphalt has a viscosity of 1000 cP to 1700 cP as measured according to ASTM D4402 using a RV3 viscometer spindle at 50 rpm and 210° F. In some embodiments, the unoxidized asphalt has a viscosity of 1000 cP to 1650 cP as measured according to ASTM D4402 using a RV3 viscometer spindle at 50 rpm and 210° F. In some embodiments, the unoxidized asphalt has a viscosity of 1000 cP to 1600 cP as measured according to ASTM D4402 using a RV3 viscometer spindle at 50 rpm and 210° F. In some embodiments, the unoxidized asphalt has a viscosity of 1000 cP to 1550 cP as measured according to ASTM D4402 using a RV3 viscometer spindle at 50 rpm and 210° F. In some embodiments, the unoxidized asphalt has a viscosity of 1000 cP to 1500 cP as measured according to ASTM D4402 using a RV3 viscometer spindle at 50 rpm and 210° F. In some embodiments, the unoxidized asphalt has a viscosity of 1000 cP to 1450 cP as measured according to ASTM D4402 using a RV3 viscometer spindle at 50 rpm and 210° F. In some embodiments, the unoxidized asphalt has a viscosity of 1000 cP to 1400 cP as measured according to ASTM D4402 using a RV3 viscometer spindle at 50 rpm and 210° F. In some embodiments, the unoxidized asphalt has a viscosity of 1000 cP to 1350 cP as measured according to ASTM D4402 using a RV3 viscometer spindle at 50 rpm and 210° F. In some embodiments, the unoxidized asphalt has a viscosity of 1000 cP to 1300 cP as measured according to ASTM D4402 using a RV3 viscometer spindle at 50 rpm and 210° F. In some embodiments, the unoxidized asphalt has a viscosity of 1000 cP to 1250 cP as measured according to ASTM D4402 using a RV3 viscometer spindle at 50 rpm and 210° F. In some embodiments, the unoxidized asphalt has a viscosity of 1000 cP to 1200 cP as measured according to ASTM D4402 using a RV3 viscometer spindle at 50 rpm and 210° F. In some embodiments, the unoxidized asphalt has a viscosity of 1000 cP to 1150 cP as measured according to ASTM D4402 using a RV3 viscometer spindle at 50 rpm and 210° F. In some embodiments, the unoxidized asphalt has a viscosity of 1000 cP to 1100 cP as measured according to ASTM D4402 using a RV3 viscometer spindle at 50 rpm and 210° F. In some embodiments, the unoxidized asphalt has a viscosity of 1000 cP to 1050 cP as measured according to ASTM D4402 using a RV3 viscometer spindle at 50 rpm and 210° F.

In some embodiments, the unoxidized asphalt has a viscosity of 1050 cP to 2000 cP as measured according to ASTM D4402 using a RV3 viscometer spindle at 50 rpm and 210° F. In some embodiments, the unoxidized asphalt has a viscosity of 1100 cP to 2000 cP as measured according to ASTM D4402 using a RV3 viscometer spindle at 50 rpm and 210° F. In some embodiments, the unoxidized asphalt has a viscosity of 1150 cP to 2000 cP as measured according to ASTM D4402 using a RV3 viscometer spindle at 50 rpm and 210° F. In some embodiments, the unoxidized asphalt has a viscosity of 1200 cP to 2000 cP as measured according to ASTM D4402 using a RV3 viscometer spindle at 50 rpm and 210° F. In some embodiments, the unoxidized asphalt has a viscosity of 1250 cP to 2000 cP as measured according to ASTM D4402 using a RV3 viscometer spindle at 50 rpm and 210° F. In some embodiments, the unoxidized asphalt has a viscosity of 1300 cP to 2000 cP as measured according to ASTM D4402 using a RV3 viscometer spindle at 50 rpm and 210° F. In some embodiments, the unoxidized asphalt has a viscosity of 1350 cP to 2000 cP as measured according to ASTM D4402 using a RV3 viscometer spindle at 50 rpm and 210° F. In some embodiments, the unoxidized asphalt has a viscosity of 1400 cP to 2000 cP as measured according to ASTM D4402 using a RV3 viscometer spindle at 50 rpm and 210° F. In some embodiments, the unoxidized asphalt has a viscosity of 1450 cP to 2000 cP as measured according to ASTM D4402 using a RV3 viscometer spindle at 50 rpm and 210° F. In some embodiments, the unoxidized asphalt has a viscosity of 1500 cP to 2000 cP as measured according to ASTM D4402 using a RV3 viscometer spindle at 50 rpm and 210° F. In some embodiments, the unoxidized asphalt has a viscosity of 1550 cP to 2000 cP as measured according to ASTM D4402 using a RV3 viscometer spindle at 50 rpm and 210° F. In some embodiments, the unoxidized asphalt has a viscosity of 1600 cP to 2000 cP as measured according to ASTM D4402 using a RV3 viscometer spindle at 50 rpm and 210° F. In some embodiments, the unoxidized asphalt has a viscosity of 1650 cP to 2000 cP as measured according to ASTM D4402 using a RV3 viscometer spindle at 50 rpm and 210° F. In some embodiments, the unoxidized asphalt has a viscosity of 1700 cP to 2000 cP as measured according to ASTM D4402 using a RV3 viscometer spindle at 50 rpm and 210° F. In some embodiments, the unoxidized asphalt has a viscosity of 1750 cP to 2000 cP as measured according to ASTM D4402 using a RV3 viscometer spindle at 50 rpm and 210° F. In some embodiments, the unoxidized asphalt has a viscosity of 1800 cP to 2000 cP as measured according to ASTM D4402 using a RV3 viscometer spindle at 50 rpm and 210° F. In some embodiments, the unoxidized asphalt has a viscosity of 1850 cP to 2000 cP as measured according to ASTM D4402 using a RV3 viscometer spindle at 50 rpm and 210° F. In some embodiments, the unoxidized asphalt has a viscosity of 1900 cP to 2000 cP as measured according to ASTM D4402 using a RV3 viscometer spindle at 50 rpm and 210° F. In some embodiments, the unoxidized asphalt has a viscosity of 1950 cP to 2000 cP as measured according to ASTM D4402 using a RV3 viscometer spindle at 50 rpm and 210° F.

In some embodiments, the unoxidized asphalt does not comprise paving grade asphalt.

In some embodiments, the method comprises mixing the rubber component and the unoxidized asphalt to obtain an unoxidized asphalt composition.

In some embodiments, the mixing comprises at least one of combining, agitating, stirring, tumbling, contacting, shaking, or any combination thereof. In some embodiments, the mixing comprises static mixing. In some embodiments, the mixing comprises low shear mixing. In some embodiments, the mixing comprises high shear mixing. In some embodiments, the mixing comprises extruding.

In some embodiments, a weight ratio of the rubber component to the unoxidized asphalt is 10:100 to 100:10 based on a total weight of the rubber component and the unoxidized asphalt. In some embodiments, a weight ratio of the rubber component to the unoxidized asphalt is 15:85 based on the total weight of the rubber component and the unoxidized asphalt. In some embodiments, a weight ratio of the rubber component to the unoxidized asphalt is 20:80 based on the total weight of the rubber component and the unoxidized asphalt. In some embodiments, a weight ratio of the rubber component to the unoxidized asphalt is 25:75 based on the total weight of the rubber component and the unoxidized asphalt. In some embodiments, a weight ratio of the rubber component to the unoxidized asphalt is 30:70 based on the total weight of the rubber component and the unoxidized asphalt. In some embodiments, a weight ratio of the rubber component to the unoxidized asphalt is 35:65 based on the total weight of the rubber component and the unoxidized asphalt. In some embodiments, a weight ratio of the rubber component to the unoxidized asphalt is 40:60 based on the total weight of the rubber component and the unoxidized asphalt. In some embodiments, a weight ratio of the rubber component to the unoxidized asphalt is 45:55 based on the total weight of the rubber component and the unoxidized asphalt. In some embodiments, a weight ratio of the rubber component to the unoxidized asphalt is 50:50 based on the total weight of the rubber component and the unoxidized asphalt.

In some embodiments, the unoxidized asphalt composition comprises 1% to 50% by weight of the rubber component based on the total weight of the unoxidized asphalt composition. In some embodiments, the unoxidized asphalt composition comprises 1% to 45% by weight of the rubber component based on the total weight of the unoxidized asphalt composition. In some embodiments, the unoxidized asphalt composition comprises 1% to 40% by weight of the rubber component based on the total weight of the unoxidized asphalt composition. In some embodiments, the unoxidized asphalt composition comprises 1% to 35% by weight of the rubber component based on the total weight of the unoxidized asphalt composition. In some embodiments, the unoxidized asphalt composition comprises 1% to 30% by weight of the rubber component based on the total weight of the unoxidized asphalt composition. In some embodiments, the unoxidized asphalt composition comprises 1% to 25% by weight of the rubber component based on the total weight of the unoxidized asphalt composition. In some embodiments, the unoxidized asphalt composition comprises 1% to 20% by weight of the rubber component based on the total weight of the unoxidized asphalt composition. In some embodiments, the unoxidized asphalt composition comprises 1% to 15% by weight of the rubber component based on the total weight of the unoxidized asphalt composition. In some embodiments, the unoxidized asphalt composition comprises 1% to 10% by weight of the rubber component based on the total weight of the unoxidized asphalt composition. In some embodiments, the unoxidized asphalt composition comprises 1% to 5% by weight of the rubber component based on the total weight of the unoxidized asphalt composition. In some embodiments, the unoxidized asphalt composition comprises 1% to 4.5% by weight of the rubber component based on the total weight of the unoxidized asphalt composition. In some embodiments, the unoxidized asphalt composition comprises 1% to 4% by weight of the rubber component based on the total weight of the unoxidized asphalt composition. In some embodiments, the unoxidized asphalt composition comprises 1% to 3.5% by weight of the rubber component based on the total weight of the unoxidized asphalt composition. In some embodiments, the unoxidized asphalt composition comprises 1% to 3% by weight of the rubber component based on the total weight of the unoxidized asphalt composition. In some embodiments, the unoxidized asphalt composition comprises 1% to 2.5% by weight of the rubber component based on the total weight of the unoxidized asphalt composition. In some embodiments, the unoxidized asphalt composition comprises 1% to 2% by weight of the rubber component based on the total weight of the unoxidized asphalt composition. In some embodiments, the unoxidized asphalt composition comprises 1% to 1.5% by weight of the rubber component based on the total weight of the unoxidized asphalt composition.

In some embodiments, the unoxidized asphalt composition comprises 5% to 50% by weight of the rubber component based on the total weight of the unoxidized asphalt composition. In some embodiments, the unoxidized asphalt composition comprises 10% to 50% by weight of the rubber component based on the total weight of the unoxidized asphalt composition. In some embodiments, the unoxidized asphalt composition comprises 15% to 50% by weight of the rubber component based on the total weight of the unoxidized asphalt composition. In some embodiments, the unoxidized asphalt composition comprises 20% to 50% by weight of the rubber component based on the total weight of the unoxidized asphalt composition. In some embodiments, the unoxidized asphalt composition comprises 25% to 50% by weight of the rubber component based on the total weight of the unoxidized asphalt composition. In some embodiments, the unoxidized asphalt composition comprises 30% to 50% by weight of the rubber component based on the total weight of the unoxidized asphalt composition. In some embodiments, the unoxidized asphalt composition comprises 35% to 50% by weight of the rubber component based on the total weight of the unoxidized asphalt composition. In some embodiments, the unoxidized asphalt composition comprises 40% to 50% by weight of the rubber component based on the total weight of the unoxidized asphalt composition. In some embodiments, the unoxidized asphalt composition comprises 45% to 50% by weight of the rubber component based on the total weight of the unoxidized asphalt composition.

In some embodiments, the unoxidized asphalt composition comprises 50% to 99% by weight of the unoxidized asphalt based on the total weight of the unoxidized asphalt composition. In some embodiments, the unoxidized asphalt composition comprises 55% to 99% by weight of the unoxidized asphalt based on the total weight of the unoxidized asphalt composition. In some embodiments, the unoxidized asphalt composition comprises 60% to 99% by weight of the unoxidized asphalt based on the total weight of the unoxidized asphalt composition. In some embodiments, the unoxidized asphalt composition comprises 65% to 99% by weight of the unoxidized asphalt based on the total weight of the unoxidized asphalt composition. In some embodiments, the unoxidized asphalt composition comprises 70% to 99% by weight of the unoxidized asphalt based on the total weight of the unoxidized asphalt composition. In some embodiments, the unoxidized asphalt composition comprises 75% to 99% by weight of the unoxidized asphalt based on the total weight of the unoxidized asphalt composition. In some embodiments, the unoxidized asphalt composition comprises 80% to 99% by weight of the unoxidized asphalt based on the total weight of the unoxidized asphalt composition. In some embodiments, the unoxidized asphalt composition comprises 85% to 99% by weight of the unoxidized asphalt based on the total weight of the unoxidized asphalt composition. In some embodiments, the unoxidized asphalt composition comprises 90% to 99% by weight of the unoxidized asphalt based on the total weight of the unoxidized asphalt composition. In some embodiments, the unoxidized asphalt composition comprises 95% to 99% by weight of the unoxidized asphalt based on the total weight of the unoxidized asphalt composition.

In some embodiments, the unoxidized asphalt composition comprises 50% to 95% by weight of the unoxidized asphalt based on the total weight of the unoxidized asphalt composition. In some embodiments, the unoxidized asphalt composition comprises 50% to 90% by weight of the unoxidized asphalt based on the total weight of the unoxidized asphalt composition. In some embodiments, the unoxidized asphalt composition comprises 50% to 85% by weight of the unoxidized asphalt based on the total weight of the unoxidized asphalt composition. In some embodiments, the unoxidized asphalt composition comprises 50% to 80% by weight of the unoxidized asphalt based on the total weight of the unoxidized asphalt composition. In some embodiments, the unoxidized asphalt composition comprises 50% to 75% by weight of the unoxidized asphalt based on the total weight of the unoxidized asphalt composition. In some embodiments, the unoxidized asphalt composition comprises 50% to 70% by weight of the unoxidized asphalt based on the total weight of the unoxidized asphalt composition. In some embodiments, the unoxidized asphalt composition comprises 50% to 65% by weight of the unoxidized asphalt based on the total weight of the unoxidized asphalt composition. In some embodiments, the unoxidized asphalt composition comprises 50% to 60% by weight of the unoxidized asphalt based on the total weight of the unoxidized asphalt composition. In some embodiments, the unoxidized asphalt composition comprises 50% to 55% by weight of the unoxidized asphalt based on the total weight of the unoxidized asphalt composition.

In some embodiments, the unoxidized asphalt and the rubber composition are mixed at a temperature of 300° F. to 425° F. In some embodiments, the unoxidized asphalt and the rubber composition are mixed at a temperature of 300° F. to 420° F. In some embodiments, the unoxidized asphalt and the rubber composition are mixed at a temperature of 300° F. to 410° F. In some embodiments, the unoxidized asphalt and the rubber composition are mixed at a temperature of 300° F. to 400° F. In some embodiments, the unoxidized asphalt and the rubber composition are mixed at a temperature of 300° F. to 390° F. In some embodiments, the unoxidized asphalt and the rubber composition are mixed at a temperature of 300° F. to 380° F. In some embodiments, the unoxidized asphalt and the rubber composition are mixed at a temperature of 300° F. to 370° F. In some embodiments, the unoxidized asphalt and the rubber composition are mixed at a temperature of 300° F. to 360° F. In some embodiments, the unoxidized asphalt and the rubber composition are mixed at a temperature of 300° F. to 350° F. In some embodiments, the unoxidized asphalt and the rubber composition are mixed at a temperature of 300° F. to 340° F. In some embodiments, the unoxidized asphalt and the rubber composition are mixed at a temperature of 300° F. to 330° F. In some embodiments, the unoxidized asphalt and the rubber composition are mixed at a temperature of 300° F. to 320° F.

In some embodiments, the unoxidized asphalt and the rubber composition are mixed at a temperature of 310° F. to 425° F. In some embodiments, the unoxidized asphalt and the rubber composition are mixed at a temperature of 320° F. to 425° F. In some embodiments, the unoxidized asphalt and the rubber composition are mixed at a temperature of 330° F. to 425° F. In some embodiments, the unoxidized asphalt and the rubber composition are mixed at a temperature of 340° F. to 425° F. In some embodiments, the unoxidized asphalt and the rubber composition are mixed at a temperature of 350° F. to 425° F. In some embodiments, the unoxidized asphalt and the rubber composition are mixed at a temperature of 360° F. to 425° F. In some embodiments, the unoxidized asphalt and the rubber composition are mixed at a temperature of 370° F. to 425° F. In some embodiments, the unoxidized asphalt and the rubber composition are mixed at a temperature of 380° F. to 425° F. In some embodiments, the unoxidized asphalt and the rubber composition are mixed at a temperature of 390° F. to 425° F. In some embodiments, the unoxidized asphalt and the rubber composition are mixed at a temperature of 400° F. to 425° F. In some embodiments, the unoxidized asphalt and the rubber composition are mixed at a temperature of 410° F. to 425° F.

In some embodiments, the method comprises oxidizing the unoxidized asphalt composition to obtain an oxidized asphalt composition.

In some embodiments, oxidizing comprises heating the unoxidized asphalt composition and blowing air sufficient for the unoxidized asphalt composition to undergo oxidation.

In some embodiments, the unoxidized asphalt composition does not comprise paving grade asphalt.

In some embodiments, the unoxidized asphalt composition is oxidized at a temperature of 200° F. to 600° F. In some embodiments, the unoxidized asphalt composition is oxidized at a temperature of 310° F. to 600° F. In some embodiments, the unoxidized asphalt composition is oxidized at a temperature of 320° F. to 600° F. In some embodiments, the unoxidized asphalt composition is oxidized at a temperature of 330° F. to 600° F. In some embodiments, the unoxidized asphalt composition is oxidized at a temperature of 340° F. to 600° F. In some embodiments, the unoxidized asphalt composition is oxidized at a temperature of 350° F. to 600° F. In some embodiments, the unoxidized asphalt composition is oxidized at a temperature of 360° F. to 600° F. In some embodiments, the unoxidized asphalt composition is oxidized at a temperature of 370° F. to 600° F. In some embodiments, the unoxidized asphalt composition is oxidized at a temperature of 380° F. to 600° F. In some embodiments, the unoxidized asphalt composition is oxidized at a temperature of 390° F. to 600° F. In some embodiments, the unoxidized asphalt composition is oxidized at a temperature of 400° F. to 600° F. In some embodiments, the unoxidized asphalt composition is oxidized at a temperature of 410° F. to 600° F. In some embodiments, the unoxidized asphalt composition is oxidized at a temperature of 420° F. to 600° F. In some embodiments, the unoxidized asphalt composition is oxidized at a temperature of 430° F. to 600° F. In some embodiments, the unoxidized asphalt composition is oxidized at a temperature of 440° F. to 600° F. In some embodiments, the unoxidized asphalt composition is oxidized at a temperature of 450° F. to 600° F. In some embodiments, the unoxidized asphalt composition is oxidized at a temperature of 460° F. to 600° F. In some embodiments, the unoxidized asphalt composition is oxidized at a temperature of 470° F. to 600° F. In some embodiments, the unoxidized asphalt composition is oxidized at a temperature of 480° F. to 600° F. In some embodiments, the unoxidized asphalt composition is oxidized at a temperature of 490° F. to 600° F. In some embodiments, the unoxidized asphalt composition is oxidized at a temperature of 500° F. to 600° F. In some embodiments, the unoxidized asphalt composition is oxidized at a temperature of 510° F. to 600° F. In some embodiments, the unoxidized asphalt composition is oxidized at a temperature of 520° F. to 600° F. In some embodiments, the unoxidized asphalt composition is oxidized at a temperature of 530° F. to 600° F. In some embodiments, the unoxidized asphalt composition is oxidized at a temperature of 540° F. to 600° F. In some embodiments, the unoxidized asphalt composition is oxidized at a temperature of 550° F. to 600° F. In some embodiments, the unoxidized asphalt composition is oxidized at a temperature of 560° F. to 600° F. In some embodiments, the unoxidized asphalt composition is oxidized at a temperature of 570° F. to 600° F. In some embodiments, the unoxidized asphalt composition is oxidized at a temperature of 580° F. to 600° F. In some embodiments, the unoxidized asphalt composition is oxidized at a temperature of 590° F. to 600° F.

In some embodiments, the unoxidized asphalt composition is oxidized at a temperature of 300° F. to 590° F. In some embodiments, the unoxidized asphalt composition is oxidized at a temperature of 300° F. to 580° F. In some embodiments, the unoxidized asphalt composition is oxidized at a temperature of 300° F. to 570° F. In some embodiments, the unoxidized asphalt composition is oxidized at a temperature of 300° F. to 560° F. In some embodiments, the unoxidized asphalt composition is oxidized at a temperature of 300° F. to 550° F. In some embodiments, the unoxidized asphalt composition is oxidized at a temperature of 300° F. to 540° F. In some embodiments, the unoxidized asphalt composition is oxidized at a temperature of 300° F. to 530° F. In some embodiments, the unoxidized asphalt composition is oxidized at a temperature of 300° F. to 520° F. In some embodiments, the unoxidized asphalt composition is oxidized at a temperature of 300° F. to 510° F. In some embodiments, the unoxidized asphalt composition is oxidized at a temperature of 300° F. to 500° F. In some embodiments, the unoxidized asphalt composition is oxidized at a temperature of 300° F. to 490° F. In some embodiments, the unoxidized asphalt composition is oxidized at a temperature of 300° F. to 480° F. In some embodiments, the unoxidized asphalt composition is oxidized at a temperature of 300° F. to 470° F. In some embodiments, the unoxidized asphalt composition is oxidized at a temperature of 300° F. to 460° F. In some embodiments, the unoxidized asphalt composition is oxidized at a temperature of 300° F. to 450° F. In some embodiments, the unoxidized asphalt composition is oxidized at a temperature of 300° F. to 440° F. In some embodiments, the unoxidized asphalt composition is oxidized at a temperature of 300° F. to 430° F. In some embodiments, the unoxidized asphalt composition is oxidized at a temperature of 300° F. to 420° F. In some embodiments, the unoxidized asphalt composition is oxidized at a temperature of 300° F. to 410° F. In some embodiments, the unoxidized asphalt composition is oxidized at a temperature of 300° F. to 400° F. In some embodiments, the unoxidized asphalt composition is oxidized at a temperature of 300° F. to 390° F. In some embodiments, the unoxidized asphalt composition is oxidized at a temperature of 300° F. to 380° F. In some embodiments, the unoxidized asphalt composition is oxidized at a temperature of 300° F. to 370° F. In some embodiments, the unoxidized asphalt composition is oxidized at a temperature of 300° F. to 360° F. In some embodiments, the unoxidized asphalt composition is oxidized at a temperature of 300° F. to 350° F. In some embodiments, the unoxidized asphalt composition is oxidized at a temperature of 300° F. to 340° F. In some embodiments, the unoxidized asphalt composition is oxidized at a temperature of 300° F. to 330° F. In some embodiments, the unoxidized asphalt composition is oxidized at a temperature of 300° F. to 320° F. In some embodiments, the unoxidized asphalt composition is oxidized at a temperature of 300° F. to 310° F.

In some embodiments, the unoxidized asphalt composition is oxidized at a temperature of 200° F. to 550° F. In some embodiments, the unoxidized asphalt composition is oxidized at a temperature of 200° F. to 530° F. In some embodiments, the unoxidized asphalt composition is oxidized at a temperature of 200° F. to 510° F. In some embodiments, the unoxidized asphalt composition is oxidized at a temperature of 210° F. to 550° F. In some embodiments, the unoxidized asphalt composition is oxidized at a temperature of 210° F. to 530° F. In some embodiments, the unoxidized asphalt composition is oxidized at a temperature of 210° F. to 510° F. In some embodiments, the unoxidized asphalt composition is oxidized at a temperature of 220° F. to 550° F. In some embodiments, the unoxidized asphalt composition is oxidized at a temperature of 220° F. to 530° F. In some embodiments, the unoxidized asphalt composition is oxidized at a temperature of 220° F. to 510° F.

In some embodiments, the unoxidized asphalt composition is oxidized at a pressure of 20 psi to 300 psi. In some embodiments, the unoxidized asphalt composition is oxidized at a pressure of 20 psi to 290 psi. In some embodiments, the unoxidized asphalt composition is oxidized at a pressure of 20 psi to 280 psi. In some embodiments, the unoxidized asphalt composition is oxidized at a pressure of 20 psi to 270 psi. In some embodiments, the unoxidized asphalt composition is oxidized at a pressure of 20 psi to 260 psi. In some embodiments, the unoxidized asphalt composition is oxidized at a pressure of 20 psi to 250 psi. In some embodiments, the unoxidized asphalt composition is oxidized at a pressure of 20 psi to 240 psi. In some embodiments, the unoxidized asphalt composition is oxidized at a pressure of 20 psi to 230 psi. In some embodiments, the unoxidized asphalt composition is oxidized at a pressure of 20 psi to 220 psi. In some embodiments, the unoxidized asphalt composition is oxidized at a pressure of 20 psi to 210 psi. In some embodiments, the unoxidized asphalt composition is oxidized at a pressure of 20 psi to 200 psi. In some embodiments, the unoxidized asphalt composition is oxidized at a pressure of 20 psi to 190 psi. In some embodiments, the unoxidized asphalt composition is oxidized at a pressure of 20 psi to 180 psi. In some embodiments, the unoxidized asphalt composition is oxidized at a pressure of 20 psi to 170 psi. In some embodiments, the unoxidized asphalt composition is oxidized at a pressure of 20 psi to 160 psi. In some embodiments, the unoxidized asphalt composition is oxidized at a pressure of 20 psi to 150 psi. In some embodiments, the unoxidized asphalt composition is oxidized at a pressure of 20 psi to 140 psi. In some embodiments, the unoxidized asphalt composition is oxidized at a pressure of 20 psi to 130 psi. In some embodiments, the unoxidized asphalt composition is oxidized at a pressure of 20 psi to 120 psi. In some embodiments, the unoxidized asphalt composition is oxidized at a pressure of 20 psi to 110 psi. In some embodiments, the unoxidized asphalt composition is oxidized at a pressure of 20 psi to 100 psi. In some embodiments, the unoxidized asphalt composition is oxidized at a pressure of 20 psi to 90 psi. In some embodiments, the unoxidized asphalt composition is oxidized at a pressure of 20 psi to 80 psi. In some embodiments, the unoxidized asphalt composition is oxidized at a pressure of 20 psi to 70 psi. In some embodiments, the unoxidized asphalt composition is oxidized at a pressure of 20 psi to 60 psi. In some embodiments, the unoxidized asphalt composition is oxidized at a pressure of 20 psi to 50 psi. In some embodiments, the unoxidized asphalt composition is oxidized at a pressure of 20 psi to 40 psi. In some embodiments, the unoxidized asphalt composition is oxidized at a pressure of 20 psi to 30 psi.

In some embodiments, the unoxidized asphalt composition is oxidized at a pressure of 30 psi to 300 psi. In some embodiments, the unoxidized asphalt composition is oxidized at a pressure of 40 psi to 300 psi. In some embodiments, the unoxidized asphalt composition is oxidized at a pressure of 50 psi to 300 psi. In some embodiments, the unoxidized asphalt composition is oxidized at a pressure of 60 psi to 300 psi. In some embodiments, the unoxidized asphalt composition is oxidized at a pressure of 70 psi to 300 psi. In some embodiments, the unoxidized asphalt composition is oxidized at a pressure of 80 psi to 300 psi. In some embodiments, the unoxidized asphalt composition is oxidized at a pressure of 90 psi to 300 psi. In some embodiments, the unoxidized asphalt composition is oxidized at a pressure of 100 psi to 300 psi. In some embodiments, the unoxidized asphalt composition is oxidized at a pressure of 110 psi to 300 psi. In some embodiments, the unoxidized asphalt composition is oxidized at a pressure of 120 psi to 300 psi. In some embodiments, the unoxidized asphalt composition is oxidized at a pressure of 130 psi to 300 psi. In some embodiments, the unoxidized asphalt composition is oxidized at a pressure of 140 psi to 300 psi. In some embodiments, the unoxidized asphalt composition is oxidized at a pressure of 150 psi to 300 psi. In some embodiments, the unoxidized asphalt composition is oxidized at a pressure of 160 psi to 300 psi. In some embodiments, the unoxidized asphalt composition is oxidized at a pressure of 170 psi to 300 psi. In some embodiments, the unoxidized asphalt composition is oxidized at a pressure of 180 psi to 300 psi. In some embodiments, the unoxidized asphalt composition is oxidized at a pressure of 190 psi to 300 psi. In some embodiments, the unoxidized asphalt composition is oxidized at a pressure of 200 psi to 300 psi. In some embodiments, the unoxidized asphalt composition is oxidized at a pressure of 210 psi to 300 psi. In some embodiments, the unoxidized asphalt composition is oxidized at a pressure of 220 psi to 300 psi. In some embodiments, the unoxidized asphalt composition is oxidized at a pressure of 230 psi to 300 psi. In some embodiments, the unoxidized asphalt composition is oxidized at a pressure of 240 psi to 300 psi. In some embodiments, the unoxidized asphalt composition is oxidized at a pressure of 250 psi to 300 psi. In some embodiments, the unoxidized asphalt composition is oxidized at a pressure of 260 psi to 300 psi. In some embodiments, the unoxidized asphalt composition is oxidized at a pressure of 270 psi to 300 psi. In some embodiments, the unoxidized asphalt composition is oxidized at a pressure of 280 psi to 300 psi. In some embodiments, the unoxidized asphalt composition is oxidized at a pressure of 290 psi to 300 psi.

In some embodiments, the oxidized asphalt composition has a penetration point of 15 dmm to 30 dmm at 77° F. as measured according to ASTM D5. In some embodiments, the oxidized asphalt composition has a penetration point of 15 dmm to 29 dmm at 77° F. as measured according to ASTM D5. In some embodiments, the oxidized asphalt composition has a penetration point of 15 dmm to 28 dmm at 77° F. as measured according to ASTM D5. In some embodiments, the oxidized asphalt composition has a penetration point of 15 dmm to 27 dmm at 77° F. as measured according to ASTM D5. In some embodiments, the oxidized asphalt composition has a penetration point of 15 dmm to 26 dmm at 77° F. as measured according to ASTM D5. In some embodiments, the oxidized asphalt composition has a penetration point of 15 dmm to 25 dmm at 77° F. as measured according to ASTM D5. In some embodiments, the oxidized asphalt composition has a penetration point of 15 dmm to 24 dmm at 77° F. as measured according to ASTM D5. In some embodiments, the oxidized asphalt composition has a penetration point of 15 dmm to 23 dmm at 77° F. as measured according to ASTM D5. In some embodiments, the oxidized asphalt composition has a penetration point of 15 dmm to 22 dmm at 77° F. as measured according to ASTM D5. In some embodiments, the oxidized asphalt composition has a penetration point of 15 dmm to 21 dmm at 77° F. as measured according to ASTM D5. In some embodiments, the oxidized asphalt composition has a penetration point of 15 dmm to 20 dmm at 77° F. as measured according to ASTM D5. In some embodiments, the oxidized asphalt composition has a penetration point of 15 dmm to 19 dmm at 77° F. as measured according to ASTM D5. In some embodiments, the oxidized asphalt composition has a penetration point of 15 dmm to 18 dmm at 77° F. as measured according to ASTM D5. In some embodiments, the oxidized asphalt composition has a penetration point of 15 dmm to 17 dmm at 77° F. as measured according to ASTM D5.

In some embodiments, the oxidized asphalt composition has a penetration point of 16 dmm to 30 dmm at 77° F. as measured according to ASTM D5. In some embodiments, the oxidized asphalt composition has a penetration point of 17 dmm to 30 dmm at 77° F. as measured according to ASTM D5. In some embodiments, the oxidized asphalt composition has a penetration point of 18 dmm to 30 dmm at 77° F. as measured according to ASTM D5. In some embodiments, the oxidized asphalt composition has a penetration point of 19 dmm to 30 dmm at 77° F. as measured according to ASTM D5. In some embodiments, the oxidized asphalt composition has a penetration point of 20 dmm to 30 dmm at 77° F. as measured according to ASTM D5. In some embodiments, the oxidized asphalt composition has a penetration point of 21 dmm to 30 dmm at 77° F. as measured according to ASTM D5. In some embodiments, the oxidized asphalt composition has a penetration point of 22 dmm to 30 dmm at 77° F. as measured according to ASTM D5. In some embodiments, the oxidized asphalt composition has a penetration point of 23 dmm to 30 dmm at 77° F. as measured according to ASTM D5. In some embodiments, the oxidized asphalt composition has a penetration point of 24 dmm to 30 dmm at 77° F. as measured according to ASTM D5. In some embodiments, the oxidized asphalt composition has a penetration point of 25 dmm to 30 dmm at 77° F. as measured according to ASTM D5. In some embodiments, the oxidized asphalt composition has a penetration point of 26 dmm to 30 dmm at 77° F. as measured according to ASTM D5. In some embodiments, the oxidized asphalt composition has a penetration point of 27 dmm to 30 dmm at 77° F. as measured according to ASTM D5. In some embodiments, the oxidized asphalt composition has a penetration point of 28 dmm to 30 dmm at 77° F. as measured according to ASTM D5. In some embodiments, the oxidized asphalt composition has a penetration point of 16 dmm to 23 dmm at 77° F. as measured according to ASTM D5. In some embodiments, the oxidized asphalt composition has a penetration point of 16 dmm to 22 dmm at 77° F. as measured according to ASTM D5.

In some embodiments, the oxidized asphalt composition has a softening point of 180° F. to 235° F. as measured according to ASTM D36. In some embodiments, the oxidized asphalt composition has a softening point of 180° F. to 230° F. as measured according to ASTM D36. In some embodiments, the oxidized asphalt composition has a softening point of 180° F. to 225° F. as measured according to ASTM D36. In some embodiments, the oxidized asphalt composition has a softening point of 180° F. to 220° F. as measured according to ASTM D36. In some embodiments, the oxidized asphalt composition has a softening point of 180° F. to 215° F. as measured according to ASTM D36. In some embodiments, the oxidized asphalt composition has a softening point of 180° F. to 210° F. as measured according to ASTM D36. In some embodiments, the oxidized asphalt composition has a softening point of 180° F. to 205° F. as measured according to ASTM D36. In some embodiments, the oxidized asphalt composition has a softening point of 180° F. to 200° F. as measured according to ASTM D36. In some embodiments, the oxidized asphalt composition has a softening point of 180° F. to 195° F. as measured according to ASTM D36. In some embodiments, the oxidized asphalt composition has a softening point of 180° F. to 190° F. as measured according to ASTM D36. In some embodiments, the oxidized asphalt composition has a softening point of 180° F. to 185° F. as measured according to ASTM D36.

In some embodiments, the oxidized asphalt composition has a softening point of 185° F. to 230° F. as measured according to ASTM D36. In some embodiments, the oxidized asphalt composition has a softening point of 190° F. to 230° F. as measured according to ASTM D36. In some embodiments, the oxidized asphalt composition has a softening point of 195° F. to 230° F. as measured according to ASTM D36. In some embodiments, the oxidized asphalt composition has a softening point of 200° F. to 230° F. as measured according to ASTM D36. In some embodiments, the oxidized asphalt composition has a softening point of 205° F. to 230° F. as measured according to ASTM D36. In some embodiments, the oxidized asphalt composition has a softening point of 210° F. to 230° F. as measured according to ASTM D36. In some embodiments, the oxidized asphalt composition has a softening point of 215° F. to 230° F. as measured according to ASTM D36. In some embodiments, the oxidized asphalt composition has a softening point of 220° F. to 230° F. as measured according to ASTM D36. In some embodiments, the oxidized asphalt composition has a softening point of 225° F. to 230° F. as measured according to ASTM D36. In some embodiments, the oxidized asphalt composition has a softening point of 190° F. to 230° F. as measured according to ASTM D36. In some embodiments, the oxidized asphalt composition has a softening point of 190° F. to 220° F. as measured according to ASTM D36. In some embodiments, the oxidized asphalt composition has a softening point of 200° F. to 230° F. as measured according to ASTM D36. In some embodiments, the oxidized asphalt composition has a softening point of 200° F. to 220° F. as measured according to ASTM D36. In some embodiments, the oxidized asphalt composition has a softening point of 180° F. to 240° F. as measured according to ASTM D36.

In some embodiments, the oxidized asphalt composition has a viscosity of 100 cP to 500 cP as measured according to ASTM D4402 using a RV3 viscometer spindle at 50 rpm and 400° F. In some embodiments, the oxidized asphalt composition has a viscosity of 100 cP to 475 cP as measured according to ASTM D4402 using a RV3 viscometer spindle at 50 rpm and 400° F. In some embodiments, the oxidized asphalt composition has a viscosity of 100 cP to 450 cP as measured according to ASTM D4402 using a RV3 viscometer spindle at 50 rpm and 400° F. In some embodiments, the oxidized asphalt composition has a viscosity of 100 cP to 425 cP as measured according to ASTM D4402 using a RV3 viscometer spindle at 50 rpm and 400° F. In some embodiments, the oxidized asphalt composition has a viscosity of 100 cP to 400 cP as measured according to ASTM D4402 using a RV3 viscometer spindle at 50 rpm and 400° F. In some embodiments, the oxidized asphalt composition has a viscosity of 100 cP to 375 cP as measured according to ASTM D4402 using a RV3 viscometer spindle at 50 rpm and 400° F. In some embodiments, the oxidized asphalt composition has a viscosity of 100 cP to 350 cP as measured according to ASTM D4402 using a RV3 viscometer spindle at 50 rpm and 400° F. In some embodiments, the oxidized asphalt composition has a viscosity of 100 cP to 325 cP as measured according to ASTM D4402 using a RV3 viscometer spindle at 50 rpm and 400° F. In some embodiments, the oxidized asphalt composition has a viscosity of 100 cP to 300 cP as measured according to ASTM D4402 using a RV3 viscometer spindle at 50 rpm and 400° F. In some embodiments, the oxidized asphalt composition has a viscosity of 100 cP to 275 cP as measured according to ASTM D4402 using a RV3 viscometer spindle at 50 rpm and 400° F. In some embodiments, the oxidized asphalt composition has a viscosity of 100 cP to 250 cP as measured according to ASTM D4402 using a RV3 viscometer spindle at 50 rpm and 400° F. In some embodiments, the oxidized asphalt composition has a viscosity of 100 cP to 225 cP as measured according to ASTM D4402 using a RV3 viscometer spindle at 50 rpm and 400° F. In some embodiments, the oxidized asphalt composition has a viscosity of 100 cP to 200 cP as measured according to ASTM D4402 using a RV3 viscometer spindle at 50 rpm and 400° F. In some embodiments, the oxidized asphalt composition has a viscosity of 100 cP to 175 cP as measured according to ASTM D4402 using a RV3 viscometer spindle at 50 rpm and 400° F. In some embodiments, the oxidized asphalt composition has a viscosity of 100 cP to 150 cP as measured according to ASTM D4402 using a RV3 viscometer spindle at 50 rpm and 400° F. In some embodiments, the oxidized asphalt composition has a viscosity of 100 cP to 125 cP as measured according to ASTM D4402 using a RV3 viscometer spindle at 50 rpm and 400° F.

In some embodiments, the oxidized asphalt composition has a viscosity of 125 cP to 500 cP as measured according to ASTM D4402 using a RV3 viscometer spindle at 50 rpm and 400° F. In some embodiments, the oxidized asphalt composition has a viscosity of 150 cP to 500 cP as measured according to ASTM D4402 using a RV3 viscometer spindle at 50 rpm and 400° F. In some embodiments, the oxidized asphalt composition has a viscosity of 175 cP to 500 cP as measured according to ASTM D4402 using a RV3 viscometer spindle at 50 rpm and 400° F. In some embodiments, the oxidized asphalt composition has a viscosity of 200 cP to 500 cP as measured according to ASTM D4402 using a RV3 viscometer spindle at 50 rpm and 400° F. In some embodiments, the oxidized asphalt composition has a viscosity of 225 cP to 500 cP as measured according to ASTM D4402 using a RV3 viscometer spindle at 50 rpm and 400° F. In some embodiments, the oxidized asphalt composition has a viscosity of 250 cP to 500 cP as measured according to ASTM D4402 using a RV3 viscometer spindle at 50 rpm and 400° F. In some embodiments, the oxidized asphalt composition has a viscosity of 275 cP to 500 cP as measured according to ASTM D4402 using a RV3 viscometer spindle at 50 rpm and 400° F. In some embodiments, the oxidized asphalt composition has a viscosity of 300 cP to 500 cP as measured according to ASTM D4402 using a RV3 viscometer spindle at 50 rpm and 400° F. In some embodiments, the oxidized asphalt composition has a viscosity of 325 cP to 500 cP as measured according to ASTM D4402 using a RV3 viscometer spindle at 50 rpm and 400° F. In some embodiments, the oxidized asphalt composition has a viscosity of 350 cP to 500 cP as measured according to ASTM D4402 using a RV3 viscometer spindle at 50 rpm and 400° F. In some embodiments, the oxidized asphalt composition has a viscosity of 375 cP to 500 cP as measured according to ASTM D4402 using a RV3 viscometer spindle at 50 rpm and 400° F. In some embodiments, the oxidized asphalt composition has a viscosity of 400 cP to 500 cP as measured according to ASTM D4402 using a RV3 viscometer spindle at 50 rpm and 400° F. In some embodiments, the oxidized asphalt composition has a viscosity of 425 cP to 500 cP as measured according to ASTM D4402 using a RV3 viscometer spindle at 50 rpm and 400° F. In some embodiments, the oxidized asphalt composition has a viscosity of 450 cP to 500 cP as measured according to ASTM D4402 using a RV3 viscometer spindle at 50 rpm and 400° F. In some embodiments, the oxidized asphalt composition has a viscosity of 475 cP to 500 cP as measured according to ASTM D4402 using a RV3 viscometer spindle at 50 rpm and 400° F.

In some embodiments, the oxidized asphalt composition has a viscosity of 200 cP to 400 cP as measured according to ASTM D4402 using a RV3 viscometer spindle at 50 rpm and 400° F. In some embodiments, the oxidized asphalt composition has a viscosity of 200 cP to 375 cP as measured according to ASTM D4402 using a RV3 viscometer spindle at 50 rpm and 400° F. In some embodiments, the oxidized asphalt composition has a viscosity of 200 cP to 350 cP as measured according to ASTM D4402 using a RV3 viscometer spindle at 50 rpm and 400° F. In some embodiments, the oxidized asphalt composition has a viscosity of 200 cP to 325 cP as measured according to ASTM D4402 using a RV3 viscometer spindle at 50 rpm and 400° F. In some embodiments, the oxidized asphalt composition has a viscosity of 200 cP to 300 cP as measured according to ASTM D4402 using a RV3 viscometer spindle at 50 rpm and 400° F. In some embodiments, the oxidized asphalt composition has a viscosity of 200 cP to 275 cP as measured according to ASTM D4402 using a RV3 viscometer spindle at 50 rpm and 400° F. In some embodiments, the oxidized asphalt composition has a viscosity of 200 cP to 250 cP as measured according to ASTM D4402 using a RV3 viscometer spindle at 50 rpm and 400° F. In some embodiments, the oxidized asphalt composition has a viscosity of 200 cP to 225 cP as measured according to ASTM D4402 using a RV3 viscometer spindle at 50 rpm and 400° F.

In some embodiments, the oxidized asphalt composition has a viscosity of 225 cP to 400 cP as measured according to ASTM D4402 using a RV3 viscometer spindle at 50 rpm and 400° F. In some embodiments, the oxidized asphalt composition has a viscosity of 250 cP to 400 cP as measured according to ASTM D4402 using a RV3 viscometer spindle at 50 rpm and 400° F. In some embodiments, the oxidized asphalt composition has a viscosity of 275 cP to 400 cP as measured according to ASTM D4402 using a RV3 viscometer spindle at 50 rpm and 400° F. In some embodiments, the oxidized asphalt composition has a viscosity of 300 cP to 400 cP as measured according to ASTM D4402 using a RV3 viscometer spindle at 50 rpm and 400° F. In some embodiments, the oxidized asphalt composition has a viscosity of 325 cP to 400 cP as measured according to ASTM D4402 using a RV3 viscometer spindle at 50 rpm and 400° F. In some embodiments, the oxidized asphalt composition has a viscosity of 350 cP to 400 cP as measured according to ASTM D4402 using a RV3 viscometer spindle at 50 rpm and 400° F. In some embodiments, the oxidized asphalt composition has a viscosity of 375 cP to 400 cP as measured according to ASTM D4402 using a RV3 viscometer spindle at 50 rpm and 400° F.

In some embodiments, the oxidized asphalt composition comprises 1% to 50% by weight of the rubber component based on a total weight of the oxidized asphalt composition. In some embodiments, the oxidized asphalt composition comprises 1% to 45% by weight of the rubber component based on the total weight of the oxidized asphalt composition. In some embodiments, the oxidized asphalt composition comprises 1% to 40% by weight of the rubber component based on the total weight of the oxidized asphalt composition. In some embodiments, the oxidized asphalt composition comprises 1% to 35% by weight of the rubber component based on the total weight of the oxidized asphalt composition. In some embodiments, the oxidized asphalt composition comprises 1% to 30% by weight of the rubber component based on the total weight of the oxidized asphalt composition. In some embodiments, the oxidized asphalt composition comprises 1% to 25% by weight of the rubber component based on the total weight of the oxidized asphalt composition. In some embodiments, the oxidized asphalt composition comprises 1% to 20% by weight of the rubber component based on the total weight of the oxidized asphalt composition. In some embodiments, the oxidized asphalt composition comprises 1% to 15% by weight of the rubber component based on the total weight of the oxidized asphalt composition. In some embodiments, the oxidized asphalt composition comprises 1% to 10% by weight of the rubber component based on the total weight of the oxidized asphalt composition. In some embodiments, the oxidized asphalt composition comprises 1% to 5% by weight of the rubber component based on the total weight of the oxidized asphalt composition. In some embodiments, the oxidized asphalt composition comprises 1% to 4.5% by weight of the rubber component based on the total weight of the oxidized asphalt composition. In some embodiments, the oxidized asphalt composition comprises 1% to 4% by weight of the rubber component based on the total weight of the oxidized asphalt composition. In some embodiments, the oxidized asphalt composition comprises 1% to 3.5% by weight of the rubber component based on the total weight of the oxidized asphalt composition. In some embodiments, the oxidized asphalt composition comprises 1% to 3% by weight of the rubber component based on the total weight of the oxidized asphalt composition. In some embodiments, the oxidized asphalt composition comprises 1% to 2.5% by weight of the rubber component based on the total weight of the oxidized asphalt composition. In some embodiments, the oxidized asphalt composition comprises 1% to 2% by weight of the rubber component based on the total weight of the oxidized asphalt composition. In some embodiments, the oxidized asphalt composition comprises 1% to 1.5% by weight of the rubber component based on the total weight of the oxidized asphalt composition.

In some embodiments, the oxidized asphalt composition comprises 5% to 50% by weight of the rubber component based on the total weight of the oxidized asphalt composition. In some embodiments, the oxidized asphalt composition comprises 10% to 50% by weight of the rubber component based on the total weight of the oxidized asphalt composition. In some embodiments, the oxidized asphalt composition comprises 15% to 50% by weight of the rubber component based on the total weight of the oxidized asphalt composition. In some embodiments, the oxidized asphalt composition comprises 20% to 50% by weight of the rubber component based on the total weight of the oxidized asphalt composition. In some embodiments, the oxidized asphalt composition comprises 25% to 50% by weight of the rubber component based on the total weight of the oxidized asphalt composition. In some embodiments, the oxidized asphalt composition comprises 30% to 50% by weight of the rubber component based on the total weight of the oxidized asphalt composition. In some embodiments, the oxidized asphalt composition comprises 35% to 50% by weight of the rubber component based on the total weight of the oxidized asphalt composition. In some embodiments, the oxidized asphalt composition comprises 40% to 50% by weight of the rubber component based on the total weight of the oxidized asphalt composition. In some embodiments, the oxidized asphalt composition comprises 45% to 50% by weight of the rubber component based on the total weight of the oxidized asphalt composition.

In some embodiments, the oxidized asphalt composition comprises 1% to 5% by weight of the rubber component based on the total weight of the oxidized asphalt composition. In some embodiments, the oxidized asphalt composition comprises 1% to 4.5% by weight of the rubber component based on the total weight of the oxidized asphalt composition. In some embodiments, the oxidized asphalt composition comprises 1% to 4% by weight of the rubber component based on the total weight of the oxidized asphalt composition. In some embodiments, the oxidized asphalt composition comprises 1% to 3.5% by weight of the rubber component based on the total weight of the oxidized asphalt composition. In some embodiments, the oxidized asphalt composition comprises 1% to 3% by weight of the rubber component based on the total weight of the oxidized asphalt composition. In some embodiments, the oxidized asphalt composition comprises 1% to 2.5% by weight of the rubber component based on the total weight of the oxidized asphalt composition. In some embodiments, the oxidized asphalt composition comprises 1% to 2% by weight of the rubber component based on the total weight of the oxidized asphalt composition. In some embodiments, the oxidized asphalt composition comprises 1% to 1.5% by weight of the rubber component based on the total weight of the oxidized asphalt composition.

In some embodiments, the oxidized asphalt composition comprises 1.5% to 5% by weight of the rubber component based on the total weight of the oxidized asphalt composition. In some embodiments, the oxidized asphalt composition comprises 2% to 5% by weight of the rubber component based on the total weight of the oxidized asphalt composition. In some embodiments, the oxidized asphalt composition comprises 2.5% to 5% by weight of the rubber component based on the total weight of the oxidized asphalt composition. In some embodiments, the oxidized asphalt composition comprises 3% to 5% by weight of the rubber component based on the total weight of the oxidized asphalt composition. In some embodiments, the oxidized asphalt composition comprises 3.5% to 5% by weight of the rubber component based on the total weight of the oxidized asphalt composition. In some embodiments, the oxidized asphalt composition comprises 4% to 5% by weight of the rubber component based on the total weight of the oxidized asphalt composition. In some embodiments, the oxidized asphalt composition comprises 4.5% to 5% by weight of the rubber component based on the total weight of the oxidized asphalt composition.

In some embodiments, the oxidized asphalt composition comprises 5% to 25% by weight of the rubber component based on the total weight of the oxidized asphalt composition. In some embodiments, the oxidized asphalt composition comprises 5% to 24% by weight of the rubber component based on the total weight of the oxidized asphalt composition. In some embodiments, the oxidized asphalt composition comprises 5% to 22% by weight of the rubber component based on the total weight of the oxidized asphalt composition. In some embodiments, the oxidized asphalt composition comprises 5% to 20% by weight of the rubber component based on the total weight of the oxidized asphalt composition. In some embodiments, the oxidized asphalt composition comprises 5% to 18% by weight of the rubber component based on the total weight of the oxidized asphalt composition. In some embodiments, the oxidized asphalt composition comprises 5% to 16% by weight of the rubber component based on the total weight of the oxidized asphalt composition. In some embodiments, the oxidized asphalt composition comprises 5% to 15% by weight of the rubber component based on the total weight of the oxidized asphalt composition. In some embodiments, the oxidized asphalt composition comprises 5% to 14% by weight of the rubber component based on the total weight of the oxidized asphalt composition. In some embodiments, the oxidized asphalt composition comprises 5% to 12% by weight of the rubber component based on the total weight of the oxidized asphalt composition. In some embodiments, the oxidized asphalt composition comprises 5% to 10% by weight of the rubber component based on the total weight of the oxidized asphalt composition. In some embodiments, the oxidized asphalt composition comprises 5% to 8% by weight of the rubber component based on the total weight of the oxidized asphalt composition.

In some embodiments, the oxidized asphalt composition comprises 6% to 25% by weight of the rubber component based on the total weight of the oxidized asphalt composition. In some embodiments, the oxidized asphalt composition comprises 8% to 25% by weight of the rubber component based on the total weight of the oxidized asphalt composition. In some embodiments, the oxidized asphalt composition comprises 10% to 25% by weight of the rubber component based on the total weight of the oxidized asphalt composition. In some embodiments, the oxidized asphalt composition comprises 12% to 25% by weight of the rubber component based on the total weight of the oxidized asphalt composition. In some embodiments, the oxidized asphalt composition comprises 14% to 25% by weight of the rubber component based on the total weight of the oxidized asphalt composition. In some embodiments, the oxidized asphalt composition comprises 15% to 25% by weight of the rubber component based on the total weight of the oxidized asphalt composition. In some embodiments, the oxidized asphalt composition comprises 16% to 25% by weight of the rubber component based on the total weight of the oxidized asphalt composition. In some embodiments, the oxidized asphalt composition comprises 18% to 25% by weight of the rubber component based on the total weight of the oxidized asphalt composition. In some embodiments, the oxidized asphalt composition comprises 20% to 25% by weight of the rubber component based on the total weight of the oxidized asphalt composition. In some embodiments, the oxidized asphalt composition comprises 22% to 25% by weight of the rubber component based on the total weight of the oxidized asphalt composition.

In some embodiments, the oxidized asphalt composition comprises 50% to 99% by weight of the asphalt based on the total weight of the oxidized asphalt composition. In some embodiments, the oxidized asphalt composition comprises 55% to 99% by weight of the asphalt based on the total weight of the oxidized asphalt composition. In some embodiments, the oxidized asphalt composition comprises 60% to 99% by weight of the asphalt based on the total weight of the oxidized asphalt composition. In some embodiments, the oxidized asphalt composition comprises 65% to 99% by weight of the asphalt based on the total weight of the oxidized asphalt composition. In some embodiments, the oxidized asphalt composition comprises 70% to 99% by weight of the asphalt based on the total weight of the oxidized asphalt composition. In some embodiments, the oxidized asphalt composition comprises 75% to 99% by weight of the asphalt based on the total weight of the oxidized asphalt composition. In some embodiments, the oxidized asphalt composition comprises 80% to 99% by weight of the asphalt based on the total weight of the oxidized asphalt composition. In some embodiments, the oxidized asphalt composition comprises 85% to 99% by weight of the asphalt based on the total weight of the oxidized asphalt composition. In some embodiments, the oxidized asphalt composition comprises 90% to 99% by weight of the asphalt based on the total weight of the oxidized asphalt composition. In some embodiments, the oxidized asphalt composition comprises 95% to 99% by weight of the asphalt based on the total weight of the oxidized asphalt composition.

In some embodiments, the oxidized asphalt composition comprises 50% to 95% by weight of the asphalt based on the total weight of the oxidized asphalt composition. In some embodiments, the oxidized asphalt composition comprises 50% to 90% by weight of the asphalt based on the total weight of the oxidized asphalt composition. In some embodiments, the oxidized asphalt composition comprises 50% to 85% by weight of the asphalt based on the total weight of the oxidized asphalt composition. In some embodiments, the oxidized asphalt composition comprises 50% to 80% by weight of the asphalt based on the total weight of the oxidized asphalt composition. In some embodiments, the oxidized asphalt composition comprises 50% to 75% by weight of the asphalt based on the total weight of the oxidized asphalt composition. In some embodiments, the oxidized asphalt composition comprises 50% to 70% by weight of the asphalt based on the total weight of the oxidized asphalt composition. In some embodiments, the oxidized asphalt composition comprises 50% to 65% by weight of the asphalt based on the total weight of the oxidized asphalt composition. In some embodiments, the oxidized asphalt composition comprises 50% to 60% by weight of the asphalt based on the total weight of the oxidized asphalt composition. In some embodiments, the oxidized asphalt composition comprises 50% to 55% by weight of the asphalt based on the total weight of the oxidized asphalt composition.

In some embodiments, the oxidized asphalt composition comprises 95% to 99% by weight of the asphalt based on the total weight of the oxidized asphalt composition. In some embodiments, the oxidized asphalt composition comprises 95% to 98.5% by weight of the asphalt based on the total weight of the oxidized asphalt composition. In some embodiments, the oxidized asphalt composition comprises 95% to 98% by weight of the asphalt based on the total weight of the oxidized asphalt composition. In some embodiments, the oxidized asphalt composition comprises 95% to 97.5% by weight of the asphalt based on the total weight of the oxidized asphalt composition. In some embodiments, the oxidized asphalt composition comprises 95% to 97% by weight of the asphalt based on the total weight of the oxidized asphalt composition. In some embodiments, the oxidized asphalt composition comprises 95% to 96.5% by weight of the asphalt based on the total weight of the oxidized asphalt composition. In some embodiments, the oxidized asphalt composition comprises 95% to 96% by weight of the asphalt based on the total weight of the oxidized asphalt composition. In some embodiments, the oxidized asphalt composition comprises 95% to 95.5% by weight of the asphalt based on the total weight of the oxidized asphalt composition.

In some embodiments, the oxidized asphalt composition comprises 95.5% to 99% by weight of the asphalt based on the total weight of the oxidized asphalt composition. In some embodiments, the oxidized asphalt composition comprises 96% to 99% by weight of the asphalt based on the total weight of the oxidized asphalt composition. In some embodiments, the oxidized asphalt composition comprises 96.5% to 99% by weight of the asphalt based on the total weight of the oxidized asphalt composition. In some embodiments, the oxidized asphalt composition comprises 97% to 99% by weight of the asphalt based on the total weight of the oxidized asphalt composition. In some embodiments, the oxidized asphalt composition comprises 97.5% to 99% by weight of the asphalt based on the total weight of the oxidized asphalt composition. In some embodiments, the oxidized asphalt composition comprises 98% to 99% by weight of the asphalt based on the total weight of the oxidized asphalt composition. In some embodiments, the oxidized asphalt composition comprises 98.5% to 99% by weight of the asphalt based on the total weight of the oxidized asphalt composition.

In some embodiments, the oxidized asphalt composition comprises 75% to 95% by weight of the asphalt based on the total weight of the oxidized asphalt composition.

In some embodiments, the oxidized asphalt composition comprises 75% to 94% by weight of the asphalt based on the total weight of the oxidized asphalt composition. In some embodiments, the oxidized asphalt composition comprises 75% to 92% by weight of the asphalt based on the total weight of the oxidized asphalt composition. In some embodiments, the oxidized asphalt composition comprises 75% to 90% by weight of the asphalt based on the total weight of the oxidized asphalt composition. In some embodiments, the oxidized asphalt composition comprises 75% to 88% by weight of the asphalt based on the total weight of the oxidized asphalt composition. In some embodiments, the oxidized asphalt composition comprises 75% to 86% by weight of the asphalt based on the total weight of the oxidized asphalt composition. In some embodiments, the oxidized asphalt composition comprises 75% to 84% by weight of the asphalt based on the total weight of the oxidized asphalt composition. In some embodiments, the oxidized asphalt composition comprises 75% to 82% by weight of the asphalt based on the total weight of the oxidized asphalt composition. In some embodiments, the oxidized asphalt composition comprises 75% to 80% by weight of the asphalt based on the total weight of the oxidized asphalt composition. In some embodiments, the oxidized asphalt composition comprises 75% to 78% by weight of the asphalt based on the total weight of the oxidized asphalt composition.

In some embodiments, the oxidized asphalt composition comprises 76% to 95% by weight of the asphalt based on the total weight of the oxidized asphalt composition. In some embodiments, the oxidized asphalt composition comprises 78% to 95% by weight of the asphalt based on the total weight of the oxidized asphalt composition. In some embodiments, the oxidized asphalt composition comprises 80% to 95% by weight of the asphalt based on the total weight of the oxidized asphalt composition. In some embodiments, the oxidized asphalt composition comprises 82% to 95% by weight of the asphalt based on the total weight of the oxidized asphalt composition. In some embodiments, the oxidized asphalt composition comprises 84% to 95% by weight of the asphalt based on the total weight of the oxidized asphalt composition. In some embodiments, the oxidized asphalt composition comprises 86% to 95% by weight of the asphalt based on the total weight of the oxidized asphalt composition. In some embodiments, the oxidized asphalt composition comprises 88% to 95% by weight of the asphalt based on the total weight of the oxidized asphalt composition. In some embodiments, the oxidized asphalt composition comprises 90% to 95% by weight of the asphalt based on the total weight of the oxidized asphalt composition. In some embodiments, the oxidized asphalt composition comprises 92% to 95% by weight of the asphalt based on the total weight of the oxidized asphalt composition.

In some embodiments, the unoxidized asphalt composition is oxidized in the absence of a catalyst. For example, in some embodiments, the unoxidized asphalt composition is not oxidized in the presence of a catalyst. In some embodiments, the unoxidized asphalt composition is not oxidized in the presence of an acid catalyst. In some embodiments, for example, the unoxidized asphalt is not oxidized in the presence of at least one of phosphorous pentoxide, phosphoric acid, chlorides of zinc, chlorides of iron (e.g., ferric chloride, ferrous chloride, etc.), chlorides of copper, chlorides of antimony, chlorides of aluminum, zinc sulphate, aluminum sulphate, carbonates, bicarbonate salts of sodium, calcium, magnesium, barium, strontium, lithium, ammonium, potassium, bismuth, lead, tetraalkylophosphonium, tetraarylphosphonium, tetraalkylammonium, trialkylammonium, dialkylammonium, transition metals, halides of transition metals, rare earth metals, boron trifluoride, lead oxide, lead naphthenate, sulfur, or any combination thereof.

In some embodiments, the unoxidized asphalt composition does not comprise a polymer. In some embodiments, the unoxidized asphalt composition does not comprise at least one of styrene butadiene, styrene butadiene styrene (SBS) copolymer, ethylene vinyl acetate (EVA), ethylene propylene copolymers, polyvinylchloride (PVC), nylon, polystyrene, polybutadiene, acrylate resins, fluorocarbon resins, phenolic resins, alkyd resins, polyesters, linear polyethylene, crosslinked polyethylene, epoxy terpolymer, polypropylene, or any combination thereof.

In some embodiments, the unoxidized asphalt composition does not comprise at least one of vegetable oil, cooking oil, animal fat, or any combination thereof. In some embodiments, the unoxidized asphalt composition does not comprise a substance derived from a plant. In some embodiments, the unoxidized asphalt composition does not comprise a substance derived from an animal. In some embodiments, the unoxidized asphalt composition does not comprise re-refined engine oil bottoms (REOBs).

In some embodiments, the method comprises forming a roofing shingle from the oxidized asphalt composition.

In some embodiments, the forming comprises obtaining a substrate and applying a coating on the substrate. In some embodiments, the applying comprises coating. In some embodiments, the applying comprises roll coating. In some embodiments, the applying comprises pouring. In some embodiments, the applying comprises extruding. In some embodiments, the applying comprises laminating. In some embodiments, the applying comprises dipping. In some embodiments, the applying comprises curtain coating. In some embodiments, the coating directly contacts the substrate. In some embodiments, the coating is an asphalt filled coating.

In some embodiments, the coating comprises the oxidized asphalt composition. Any of the oxidized asphalt compositions disclosed herein may be used without departing from the scope of this disclosure. In some embodiments, the coating comprises at least one filler. In some embodiments, the at least one filler comprises at least one of calcium carbonate, barium sulfate, calcium sulfate, talc, limestone, perlite, silica, fumed silica, precipitated silica, quartz, aluminum trihydrate, magnesium hydroxide, colemanite, titanium dioxide, snow white, fly ash, graphene nanoparticles, carbon black, recycled rubber tires, recycled shingles, recycled thermoplastic resins, basalt, roofing granules, clay, ammonium polyphosphate, graphite, or any combination thereof.

In some embodiments, the coating comprises 10% to 90% by weight of the oxidized asphalt composition based on a total weight of the coating. In some embodiments, the coating comprises 10% to 85% by weight of the oxidized asphalt composition based on the total weight of the coating. In some embodiments, the coating comprises 10% to 80% by weight of the oxidized asphalt composition based on the total weight of the coating. In some embodiments, the coating comprises 10% to 75% by weight of the oxidized asphalt composition based on the total weight of the coating. In some embodiments, the coating comprises 10% to 70% by weight of the oxidized asphalt composition based on the total weight of the coating. In some embodiments, the coating comprises 10% to 65% by weight of the oxidized asphalt composition based on the total weight of the coating. In some embodiments, the coating comprises 10% to 60% by weight of the oxidized asphalt composition based on the total weight of the coating. In some embodiments, the coating comprises 10% to 55% by weight of the oxidized asphalt composition based on the total weight of the coating. In some embodiments, the coating comprises 10% to 50% by weight of the oxidized asphalt composition based on the total weight of the coating. In some embodiments, the coating comprises 10% to 45% by weight of the oxidized asphalt composition based on the total weight of the coating. In some embodiments, the coating comprises 10% to 40% by weight of the oxidized asphalt composition based on the total weight of the coating. In some embodiments, the coating comprises 10% to 35% by weight of the oxidized asphalt composition based on the total weight of the coating. In some embodiments, the coating comprises 10% to 30% by weight of the oxidized asphalt composition based on the total weight of the coating. In some embodiments, the coating comprises 10% to 25% by weight of the oxidized asphalt composition based on the total weight of the coating. In some embodiments, the coating comprises 10% to 20% by weight of the oxidized asphalt composition based on the total weight of the coating. In some embodiments, the coating comprises 10% to 15% by weight of the oxidized asphalt composition based on the total weight of the coating.

In some embodiments, the coating comprises 15% to 90% by weight of the oxidized asphalt composition based on the total weight of the coating. In some embodiments, the coating comprises 20% to 90% by weight of the oxidized asphalt composition based on the total weight of the coating. In some embodiments, the coating comprises 25% to 90% by weight of the oxidized asphalt composition based on the total weight of the coating. In some embodiments, the coating comprises 30% to 90% by weight of the oxidized asphalt composition based on the total weight of the coating. In some embodiments, the coating comprises 35% to 90% by weight of the oxidized asphalt composition based on the total weight of the coating. In some embodiments, the coating comprises 40% to 90% by weight of the oxidized asphalt composition based on the total weight of the coating. In some embodiments, the coating comprises 45% to 90% by weight of the oxidized asphalt composition based on the total weight of the coating. In some embodiments, the coating comprises 50% to 90% by weight of the oxidized asphalt composition based on the total weight of the coating. In some embodiments, the coating comprises 55% to 90% by weight of the oxidized asphalt composition based on the total weight of the coating. In some embodiments, the coating comprises 60% to 90% by weight of the oxidized asphalt composition based on the total weight of the coating. In some embodiments, the coating comprises 65% to 90% by weight of the oxidized asphalt composition based on the total weight of the coating. In some embodiments, the coating comprises 70% to 90% by weight of the oxidized asphalt composition based on the total weight of the coating. In some embodiments, the coating comprises 75% to 90% by weight of the oxidized asphalt composition based on the total weight of the coating. In some embodiments, the coating comprises 80% to 90% by weight of the oxidized asphalt composition based on the total weight of the coating. In some embodiments, the coating comprises 85% to 90% by weight of the oxidized asphalt composition based on the total weight of the coating. In some embodiments, the coating comprises 30% to 50% by weight of the oxidized asphalt composition based on the total weight of the coating.

In some embodiments, the coating comprises 10% to 90% by weight of the asphalt based on the total weight of the coating. In some embodiments, the coating comprises 15% to 90% by weight of the asphalt based on the total weight of the coating. In some embodiments, the coating comprises 20% to 90% by weight of the asphalt based on the total weight of the coating. In some embodiments, the coating comprises 25% to 90% by weight of the asphalt based on the total weight of the coating. In some embodiments, the coating comprises 30% to 90% by weight of the asphalt based on the total weight of the coating. In some embodiments, the coating comprises 35% to 90% by weight of the asphalt based on the total weight of the coating. In some embodiments, the coating comprises 40% to 90% by weight of the asphalt based on the total weight of the coating. In some embodiments, the coating comprises 45% to 90% by weight of the asphalt based on the total weight of the coating. In some embodiments, the coating comprises 50% to 90% by weight of the asphalt based on the total weight of the coating. In some embodiments, the coating comprises 55% to 90% by weight of the asphalt based on the total weight of the coating. In some embodiments, the coating comprises 60% to 90% by weight of the asphalt based on the total weight of the coating. In some embodiments, the coating comprises 65% to 90% by weight of the asphalt based on the total weight of the coating. In some embodiments, the coating comprises 70% to 90% by weight of the asphalt based on the total weight of the coating. In some embodiments, the coating comprises 75% to 90% by weight of the asphalt based on the total weight of the coating. In some embodiments, the coating comprises 80% to 90% by weight of the asphalt based on the total weight of the coating. In some embodiments, the coating comprises 85% to 90% by weight of the asphalt based on the total weight of the coating.

In some embodiments, the coating comprises 10% to 15% by weight of the asphalt based on the total weight of the coating. In some embodiments, the coating comprises 10% to 20% by weight of the asphalt based on the total weight of the coating. In some embodiments, the coating comprises 10% to 25% by weight of the asphalt based on the total weight of the coating. In some embodiments, the coating comprises 10% to 30% by weight of the asphalt based on the total weight of the coating. In some embodiments, the coating comprises 10% to 35% by weight of the asphalt based on the total weight of the coating. In some embodiments, the coating comprises 10% to 40% by weight of the asphalt based on the total weight of the coating. In some embodiments, the coating comprises 10% to 45% by weight of the asphalt based on the total weight of the coating. In some embodiments, the coating comprises 10% to 50% by weight of the asphalt based on the total weight of the coating. In some embodiments, the coating comprises 10% to 55% by weight of the asphalt based on the total weight of the coating. In some embodiments, the coating comprises 10% to 60% by weight of the asphalt based on the total weight of the coating. In some embodiments, the coating comprises 10% to 65% by weight of the asphalt based on the total weight of the coating. In some embodiments, the coating comprises 10% to 70% by weight of the asphalt based on the total weight of the coating. In some embodiments, the coating comprises 10% to 75% by weight of the asphalt based on the total weight of the coating. In some embodiments, the coating comprises 10% to 80% by weight of the asphalt based on the total weight of the coating. In some embodiments, the coating comprises 10% to 85% by weight of the asphalt based on the total weight of the coating.

In some embodiments, the coating comprises 10% to 90% by weight of the at least one filler based on the total weight of the coating. In some embodiments, the coating comprises 10% to 85% by weight of the at least one filler based on the total weight of the coating. In some embodiments, the coating comprises 10% to 80% by weight of the at least one filler based on the total weight of the coating. In some embodiments, the coating comprises 10% to 75% by weight of the at least one filler based on the total weight of the coating. In some embodiments, the coating comprises 10% to 70% by weight of the at least one filler based on the total weight of the coating. In some embodiments, the coating comprises 10% to 65% by weight of the at least one filler based on the total weight of the coating. In some embodiments, the coating comprises 10% to 60% by weight of the at least one filler based on the total weight of the coating. In some embodiments, the coating comprises 10% to 55% by weight of the at least one filler based on the total weight of the coating. In some embodiments, the coating comprises 10% to 50% by weight of the at least one filler based on the total weight of the coating. In some embodiments, the coating comprises 10% to 45% by weight of the at least one filler based on the total weight of the coating. In some embodiments, the coating comprises 10% to 40% by weight of the at least one filler based on the total weight of the coating. In some embodiments, the coating comprises 10% to 35% by weight of the at least one filler based on the total weight of the coating. In some embodiments, the coating comprises 10% to 30% by weight of the at least one filler based on the total weight of the coating. In some embodiments, the coating comprises 10% to 25% by weight of the at least one filler based on the total weight of the coating. In some embodiments, the coating comprises 10% to 20% by weight of the at least one filler based on the total weight of the coating. In some embodiments, the coating comprises 10% to 15% by weight of the at least one filler based on the total weight of the coating.

In some embodiments, the coating comprises 10% to 90% by weight of the at least one filler based on the total weight of the coating. In some embodiments, the coating comprises 15% to 90% by weight of the at least one filler based on the total weight of the coating. In some embodiments, the coating comprises 20% to 90% by weight of the at least one filler based on the total weight of the coating. In some embodiments, the coating comprises 25% to 90% by weight of the at least one filler based on the total weight of the coating. In some embodiments, the coating comprises 30% to 90% by weight of the at least one filler based on the total weight of the coating. In some embodiments, the coating comprises 35% to 90% by weight of the at least one filler based on the total weight of the coating. In some embodiments, the coating comprises 40% to 90% by weight of the at least one filler based on the total weight of the coating. In some embodiments, the coating comprises 45% to 90% by weight of the at least one filler based on the total weight of the coating. In some embodiments, the coating comprises 50% to 90% by weight of the at least one filler based on the total weight of the coating. In some embodiments, the coating comprises 55% to 90% by weight of the at least one filler based on the total weight of the coating. In some embodiments, the coating comprises 60% to 90% by weight of the at least one filler based on the total weight of the coating. In some embodiments, the coating comprises 65% to 90% by weight of the at least one filler based on the total weight of the coating. In some embodiments, the coating comprises 70% to 90% by weight of the at least one filler based on the total weight of the coating. In some embodiments, the coating comprises 75% to 90% by weight of the at least one filler based on the total weight of the coating. In some embodiments, the coating comprises 80% to 90% by weight of the at least one filler based on the total weight of the coating. In some embodiments, the coating comprises 85% to 90% by weight of the at least one filler based on the total weight of the coating. In some embodiments, the coating comprises 50% to 70% by weight of the at least one filler based on the total weight of the coating.

In some embodiments, the coating comprises 10% to 90% by weight of the rubber component based on the total weight of the coating. In some embodiments, the coating comprises 10% to 85% by weight of the rubber component based on the total weight of the coating. In some embodiments, the coating comprises 10% to 80% by weight of the rubber component based on the total weight of the coating. In some embodiments, the coating comprises 10% to 75% by weight of the rubber component based on the total weight of the coating. In some embodiments, the coating comprises 10% to 70% by weight of the rubber component based on the total weight of the coating. In some embodiments, the coating comprises 10% to 65% by weight of the rubber component based on the total weight of the coating. In some embodiments, the coating comprises 10% to 60% by weight of the rubber component based on the total weight of the coating. In some embodiments, the coating comprises 10% to 55% by weight of the rubber component based on the total weight of the coating. In some embodiments, the coating comprises 10% to 50% by weight of the rubber component based on the total weight of the coating. In some embodiments, the coating comprises 10% to 45% by weight of the rubber component based on the total weight of the coating. In some embodiments, the coating comprises 10% to 40% by weight of the rubber component based on the total weight of the coating. In some embodiments, the coating comprises 10% to 35% by weight of the rubber component based on the total weight of the coating. In some embodiments, the coating comprises 10% to 30% by weight of the rubber component based on the total weight of the coating. In some embodiments, the coating comprises 10% to 25% by weight of the rubber component based on the total weight of the coating. In some embodiments, the coating comprises 10% to 20% by weight of the rubber component based on the total weight of the coating. In some embodiments, the coating comprises 10% to 15% by weight of the rubber component based on the total weight of the coating.

In some embodiments, the coating comprises 10% to 90% by weight of the rubber component. In some embodiments, the coating comprises 15% to 90% by weight of the rubber component. In some embodiments, the coating comprises 20% to 90% by weight of the rubber component. In some embodiments, the coating comprises 25% to 90% by weight of the rubber component. In some embodiments, the coating comprises 30% to 90% by weight of the rubber component. In some embodiments, the coating comprises 35% to 90% by weight of the rubber component. In some embodiments, the coating comprises 40% to 90% by weight of the rubber component. In some embodiments, the coating comprises 45% to 90% by weight of the rubber component. In some embodiments, the coating comprises 50% to 90% by weight of the rubber component. In some embodiments, the coating comprises 55% to 90% by weight of the rubber component. In some embodiments, the coating comprises 60% to 90% by weight of the rubber component. In some embodiments, the coating comprises 65% to 90% by weight of the rubber component. In some embodiments, the coating comprises 70% to 90% by weight of the rubber component. In some embodiments, the coating comprises 75% to 90% by weight of the rubber component. In some embodiments, the coating comprises 80% to 90% by weight of the rubber component. In some embodiments, the coating comprises 85% to 90% by weight of the rubber component.

In some embodiments, the coating having a thickness of 1 mils to 200 mils. In some embodiments, the coating having a thickness of 1 mils to 190 mils. In some embodiments, the coating having a thickness of 1 mils to 180 mils. In some embodiments, the coating having a thickness of 1 mils to 170 mils. In some embodiments, the coating having a thickness of 1 mils to 160 mils. In some embodiments, the coating having a thickness of 1 mils to 150 mils. In some embodiments, the coating having a thickness of 1 mils to 140 mils. In some embodiments, the coating having a thickness of 1 mils to 130 mils. In some embodiments, the coating having a thickness of 1 mils to 120 mils. In some embodiments, the coating having a thickness of 1 mils to 110 mils. In some embodiments, the coating having a thickness of 1 mils to 100 mils. In some embodiments, the coating having a thickness of 1 mils to 100 mils. In some embodiments, the coating having a thickness of 1 mils to 90 mils. In some embodiments, the coating having a thickness of 1 mils to 80 mils. In some embodiments, the coating having a thickness of 1 mils to 70 mils. In some embodiments, the coating having a thickness of 1 mils to 60 mils. In some embodiments, the coating having a thickness of 1 mils to 50 mils. In some embodiments, the coating having a thickness of 1 mils to 40 mils. In some embodiments, the coating having a thickness of 1 mils to 30 mils. In some embodiments, the coating having a thickness of 1 mils to 20 mils. In some embodiments, the coating having a thickness of 1 mils to 10 mils.

In some embodiments, the coating having a thickness of 10 mils to 200 mils. In some embodiments, the coating having a thickness of 20 mils to 200 mils. In some embodiments, the coating having a thickness of 30 mils to 200 mils. In some embodiments, the coating having a thickness of 40 mils to 200 mils. In some embodiments, the coating having a thickness of 50 mils to 200 mils. In some embodiments, the coating having a thickness of 60 mils to 200 mils. In some embodiments, the coating having a thickness of 70 mils to 200 mils. In some embodiments, the coating having a thickness of 80 mils to 200 mils. In some embodiments, the coating having a thickness of 90 mils to 200 mils. In some embodiments, the coating having a thickness of 100 mils to 200 mils. In some embodiments, the coating having a thickness of 110 mils to 200 mils. In some embodiments, the coating having a thickness of 120 mils to 200 mils. In some embodiments, the coating having a thickness of 130 mils to 200 mils. In some embodiments, the coating having a thickness of 140 mils to 200 mils. In some embodiments, the coating having a thickness of 150 mils to 200 mils. In some embodiments, the coating having a thickness of 160 mils to 200 mils. In some embodiments, the coating having a thickness of 170 mils to 200 mils. In some embodiments, the coating having a thickness of 180 mils to 200 mils. In some embodiments, the coating having a thickness of 190 mils to 200 mils.

In some embodiments, the coating has a penetration point of 15 dmm to 50 dmm at 77° F. as measured according to ASTM D5. In some embodiments, the coating has a penetration point of 15 dmm to 50 dmm at 77° F. as measured according to ASTM D5. In some embodiments, the coating has a penetration point of 20 dmm to 50 dmm at 77° F. as measured according to ASTM D5. In some embodiments, the coating has a penetration point of 25 dmm to 50 dmm at 77° F. as measured according to ASTM D5. In some embodiments, the coating has a penetration point of 30 dmm to 50 dmm at 77° F. as measured according to ASTM D5. In some embodiments, the coating has a penetration point of 35 dmm to 50 dmm at 77° F. as measured according to ASTM D5. In some embodiments, the coating has a penetration point of 40 dmm to 50 dmm at 77° F. as measured according to ASTM D5. In some embodiments, the coating has a penetration point of 45 dmm to 50 dmm at 77° F. as measured according to ASTM D5.

In some embodiments, the coating has a penetration point of 15 dmm to 45 dmm at 77° F. as measured according to ASTM D5. In some embodiments, the coating has a penetration point of 15 dmm to 40 dmm at 77° F. as measured according to ASTM D5. In some embodiments, the coating has a penetration point of 15 dmm to 35 dmm at 77° F. as measured according to ASTM D5. In some embodiments, the coating has a penetration point of 15 dmm to 30 dmm at 77° F. as measured according to ASTM D5. In some embodiments, the coating has a penetration point of 15 dmm to 25 dmm at 77° F. as measured according to ASTM D5. In some embodiments, the coating has a penetration point of 15 dmm to 20 dmm at 77° F. as measured according to ASTM D5.

In some embodiments, the coating has a softening point of 180° F. to 320° F. as measured according to ASTM D36. In some embodiments, the coating has a softening point of 190° F. to 320° F. as measured according to ASTM D36. In some embodiments, the coating has a softening point of 200° F. to 320° F. as measured according to ASTM D36. In some embodiments, the coating has a softening point of 210° F. to 320° F. as measured according to ASTM D36. In some embodiments, the coating has a softening point of 220° F. to 320° F. as measured according to ASTM D36. In some embodiments, the coating has a softening point of 230° F. to 320° F. as measured according to ASTM D36. In some embodiments, the coating has a softening point of 240° F. to 320° F. as measured according to ASTM D36. In some embodiments, the coating has a softening point of 250° F. to 320° F. as measured according to ASTM D36. In some embodiments, the coating has a softening point of 260° F. to 320° F. as measured according to ASTM D36. In some embodiments, the coating has a softening point of 270° F. to 320° F. as measured according to ASTM D36. In some embodiments, the coating has a softening point of 280° F. to 320° F. as measured according to ASTM D36. In some embodiments, the coating has a softening point of 290° F. to 320° F. as measured according to ASTM D36. In some embodiments, the coating has a softening point of 300° F. to 320° F. as measured according to ASTM D36. In some embodiments, the coating has a softening point of 310° F. to 320° F. as measured according to ASTM D36.

In some embodiments, the coating has a softening point of 180° F. to 310° F. as measured according to ASTM D36. In some embodiments, the coating has a softening point of 180° F. to 300° F. as measured according to ASTM D36. In some embodiments, the coating has a softening point of 180° F. to 290° F. as measured according to ASTM D36. In some embodiments, the coating has a softening point of 180° F. to 280° F. as measured according to ASTM D36. In some embodiments, the coating has a softening point of 180° F. to 270° F. as measured according to ASTM D36. In some embodiments, the coating has a softening point of 180° F. to 260° F. as measured according to ASTM D36. In some embodiments, the coating has a softening point of 180° F. to 250° F. as measured according to ASTM D36. In some embodiments, the coating has a softening point of 180° F. to 240° F. as measured according to ASTM D36. In some embodiments, the coating has a softening point of 180° F. to 230° F. as measured according to ASTM D36. In some embodiments, the coating has a softening point of 180° F. to 220° F. as measured according to ASTM D36. In some embodiments, the coating has a softening point of 180° F. to 210° F. as measured according to ASTM D36. In some embodiments, the coating has a softening point of 180° F. to 200° F. as measured according to ASTM D36. In some embodiments, the coating has a softening point of 180° F. to 190° F. as measured according to ASTM D36.

In some embodiments, the roofing shingle comprises a plurality of granules on the coating. In some embodiments, the plurality of granules directly contacts the coating. In some embodiments, the plurality of granules is embedded in the coating. In some embodiments, each of the plurality of granules comprises a base particle and a colored coating on a surface of the base particle. In some embodiments, the base particle comprises at least one of greenstone, rhyolite, andesite, basalt, metabasalt, nepheline syenite, ceramic grog, talc, slag, silica sand, greystone, trap rock, granite, siliceous sand, porphyry, marble, syenite, diabase, quartz, slate, sandstone, marine shells, or any combination thereof. In some embodiments, the colored coating comprises a colorant. In some embodiments, the colorant comprises at least one of a pigment, a dye, or any combination thereof. In some embodiments, the colored coating comprises at least one of a reflective pigment, a transition metal oxide, a cool pigment, a metallic pigment, a metallic particle, a mirrored pigment, a light scattering additive, an opacifier, a thin-film coated particle, a near infrared-reflecting pigment, light-interference platelet pigment, a silica pigment, a metal flake pigment, an inorganic pigment, or any combination thereof. Non-limiting examples of pigments and dyes include, without limitation, at least one of an infrared reflective pigment/dye, a phosphorescence pigment/dye, a fluorescence pigment/dye, or any combination thereof. In some embodiments, the colored coating comprises at least one of TiO2, alumina, silica, iron oxide, tin oxide, SiO2, aluminum oxide, mica, rutile, anatase, alloys, aluminum, iron, copper, brass, titanium, cobalt, stainless steel, chromium, nickel, or any combination thereof. In some embodiments, the colored coating comprises water.

In some embodiments, the roofing shingle comprises 1 granule to 100,000 granules. In some embodiments, the roofing shingle comprises 1 granule to 10,000 granules. In some embodiments, the roofing shingle comprises 1 granule to 9,000 granules. In some embodiments, the roofing shingle comprises 1 granule to 8,000 granules. In some embodiments, the roofing shingle comprises 1 granule to 7,000 granules. In some embodiments, the roofing shingle comprises 1 granule to 6,000 granules. In some embodiments, the roofing shingle comprises 1 granule to 5,000 granules. In some embodiments, the roofing shingle comprises 1 granule to 4,000 granules. In some embodiments, the roofing shingle comprises 1 granule to 3,000 granules. In some embodiments, the roofing shingle comprises 1 granule to 2,000 granules. In some embodiments, the roofing shingle comprises 1 granule to 1,000 granules. In some embodiments, the roofing shingle comprises 1,000 granules to 10,000 granules. In some embodiments, the roofing shingle comprises 2,000 granules to 10,000 granules. In some embodiments, the roofing shingle comprises 3,000 granules to 10,000 granules. In some embodiments, the roofing shingle comprises 4,000 granules to 10,000 granules. In some embodiments, the roofing shingle comprises 5,000 granules to 10,000 granules. In some embodiments, the roofing shingle comprises 6,000 granules to 10,000 granules. In some embodiments, the roofing shingle comprises 7,000 granules to 10,000 granules. In some embodiments, the roofing shingle comprises 8,000 granules to 10,000 granules. In some embodiments, the roofing shingle comprises 9,000 granules to 10,000 granules.

In some embodiments, the substrate comprises at least one of an asphaltic substrate, a plywood substrate, a glass substrate, a cellulosic substrate, a roof shingle, a glass mat, a fiberglass mat, a polyester mat, an underlayment, a roofing membrane, a roof deck, a photovoltaic (PV) panel, a modified bitumen (MODBIT) substrate, a roll good, a board (such as but not limited to at least one of a foam board (e.g., a polyisocyanurate (ISO) foam board), a cover board, or any combination thereof), a pipe, a base sheet, a chimney, a wax paper, or any combination thereof. In some embodiments, the substrate comprises asphalt. In some embodiments, an asphaltic substrate comprises a substrate, and an asphalt filled coating on the substrate. In some embodiments, the asphalt filled coating comprises asphalt and at least one filler. In some embodiments, the substrate does not comprise asphalt.

Some embodiments relate to a roofing shingle. In some embodiments, the roofing shingle comprises a substrate. In some embodiments, the substrate has a top surface and a bottom surface. In some embodiments, the roofing shingle comprises an oxidized asphalt composition on the substrate. In some embodiments, the oxidized asphalt composition is on the top surface of the substrate. In some embodiments, the roofing shingle comprises an unoxidized asphalt composition on the substrate. In some embodiments, the unoxidized asphalt composition is on the top surface of the substrate.

Some embodiments relate to a roofing system. In some embodiments, the roofing system comprises a roof substrate. For example, in some embodiments, the roof substrate comprises a roof deck. In some embodiments, the roof substrate comprises an underlayment. In some embodiments, the roof substrate comprises a steep slope roof. Other roof substrates may be used herein without departing from the scope of this disclosure. In some embodiments, the roofing system comprises a plurality of roofing shingles on the roof substrate. In some embodiments, each roofing shingle of the plurality of roofing shingles comprises a substrate, and a coating on the substrate. In some embodiments, the coating comprises an oxidized asphalt composition. In some embodiments, each roofing shingle of the plurality of roofing shingles comprises a substrate, and an unoxidized asphalt composition on the substrate. In some embodiments, each roofing shingle of the plurality of roofing shingles further comprises roofing granules on at least one of the oxidized asphalt composition, the unoxidized asphalt composition, or any combination thereof.

In some embodiments, the roof substrate is a steep slope roof substrate. As defined herein, a "steep slope roof substrate" is any roof substrate that is disposed on a roof having a pitch of Y/X, where Y and X are in a ratio of 4:12 to 12:12, where Y corresponds to the "rise" of the roof, and where X corresponds to the "run" of the roof. In some embodiments, Y and X are in a ratio of 5:12 to 12:12. In some embodiments, Y and X are in a ratio of 6:12 to 12:12. In some embodiments, Y and X are in a ratio of 7:12 to 12:12. In some embodiments, Y and X are in a ratio of 8:12 to 12:12. In some embodiments, Y and X are in a ratio of 9:12 to 12:12. In some embodiments, Y and X are in a ratio of 10:12 to 12:12. In some embodiments, Y and X are in a ratio of 11:12 to 12:12.

In some embodiments, Y and X are in a ratio of 4:12 to 11:12. In some embodiments, Y and X are in a ratio of 4:12 to 10:12. In some embodiments, Y and X are in a ratio of 4:12 to 9:12. In some embodiments, Y and X are in a ratio of 4:12 to 8:12. In some embodiments, Y and X are in a ratio of 4:12 to 7:12. In some embodiments, Y and X are in a ratio of 4:12 to 6:12. In some embodiments, Y and X are in a ratio of 4:12 to 5:12. In some embodiments, Y and X are in a ratio of 5:12 to 11:12. In some embodiments, Y and X are in a ratio of 6:12 to 10:12. In some embodiments, Y and X are in a ratio of 7:12 to 9:12.

FIG. 1 is a flowchart of a method 100 for producing an oxidized asphalt composition, according to some embodiments. As shown in FIG. 1, the method 100 may comprise one or more of the following steps: a step 102 of obtaining a rubber component; a step 104 of obtaining an unoxidized asphalt; a step 106 of mixing the rubber component and the unoxidized asphalt to obtain an unoxidized asphalt composition; a step 108 of oxidizing the unoxidized asphalt composition to obtain an oxidized asphalt composition; and a step 110 of forming a roofing shingle from the oxidized asphalt composition. In some embodiments, the unoxidized asphalt has a penetration point of 200 dmm or greater at 77° F. as measured according to ASTM D5. In some embodiments, the unoxidized asphalt has a penetration point of less than 200 dmm at 77° F. as measured according to ASTM D5.

Figure 2:
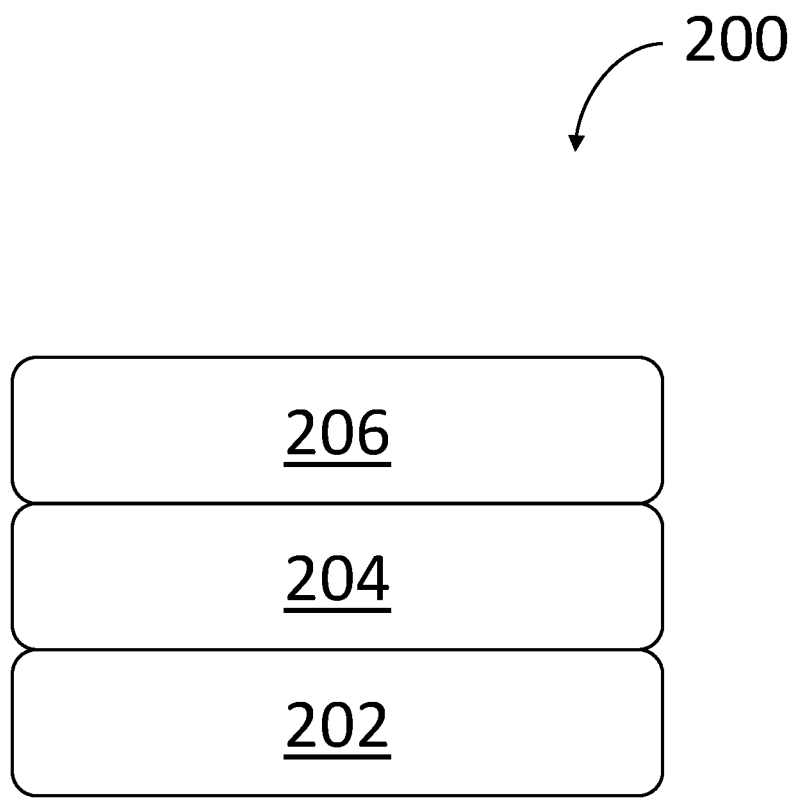
FIG. 2 is a schematic diagram of a cross-section of a roofing shingle, according to some embodiments.

FIG. 2 is a schematic diagram of a cross-section of a roofing shingle 200, according to some embodiments. As shown in FIG. 2, the roofing shingle 200 comprises a substrate 202. In some embodiments, the substrate 202 has a top surface and a bottom surface. In some embodiments, the roofing shingle 200 comprises a filled coating 204 on the top surface of the substrate 202. In some embodiments, the filled coating 204 comprises an oxidized asphalt composition and at least one filler. In some embodiments, the oxidized asphalt composition has a top surface and a bottom surface. In some embodiments, the roofing shingle 200 comprises a surface coating 206 on the top surface of the oxidized asphalt composition. In some embodiments, the surface coating 206 comprises at least one of granules, fines, or sands.

EXAMPLE 1

Sample A. A rubber composition containing 30 mesh ground tire rubber and devulcanized rubber at a weight ratio of 1:2 was mixed with Unoxidized Asphalt A to obtain an unoxidized asphalt composition. The unoxidized asphalt composition included 98.2% by weight of the Unoxidized Asphalt A and 1.8% by weight of the rubber composition. The weight percentages are based on a total weight of the unoxidized asphalt composition. The unoxidized asphalt composition was oxidized via an air blowing process. The softening point (° F.) as measured according to ASTM D36, the penetration point (dmm) at 77° F. as measured according to ASTM D5, and the viscosity (cP) as measured according to ASTM D4402 using a RV3 viscometer spindle at 50 rpm and 400° F. for the resulting oxidized asphalt composition is presented in Table 1 as Sample A.

EXAMPLE 2

Sample B. A rubber composition containing 30 mesh ground tire rubber and devulcanized rubber at a weight ratio of 1:2 was mixed with Unoxidized Asphalt B to obtain an unoxidized asphalt composition. The unoxidized asphalt composition included 97.6% by weight of the Unoxidized Asphalt B and 2.4% by weight of the rubber composition. The weight percentages are based on a total weight of the unoxidized asphalt composition. The unoxidized asphalt composition was oxidized via an air blowing process. The softening point (° F.) as measured according to ASTM D36, the penetration point (dmm) at 77° F. as measured according to ASTM D5, and the viscosity (cP) as measured according to ASTM D4402 using a RV3 viscometer spindle at 50 rpm and 400° F. for the resulting oxidized asphalt composition is presented in Table 1 as Sample B.

EXAMPLE 3

Sample C. A rubber composition containing 30 mesh ground tire rubber and devulcanized rubber at a weight ratio of 1:2 was mixed with Unoxidized Asphalt C to obtain an unoxidized asphalt composition. The unoxidized asphalt composition included 97.6% by weight of the Unoxidized Asphalt C and 2.4% by weight of the rubber composition. The weight percentages are based on a total weight of the unoxidized asphalt composition. The unoxidized asphalt composition was oxidized via an air blowing process. The softening point (° F.) as measured according to ASTM D36, the penetration point (dmm) at 77° F. as measured according to ASTM D5, and the viscosity (cP) as measured according to ASTM D4402 using a RV3 viscometer spindle at 50 rpm and 400° F. for the resulting oxidized asphalt composition is presented in Table 1 as Sample C.

EXAMPLE 4

Sample D. A rubber composition containing 30 mesh ground tire rubber and devulcanized rubber at a weight ratio of 1:2 was mixed with Unoxidized Asphalt D to obtain an unoxidized asphalt composition. The unoxidized asphalt composition included 94% by weight of the Unoxidized Asphalt D and 6% by weight of the rubber composition. The weight percentages are based on a total weight of the unoxidized asphalt composition. The unoxidized asphalt composition was oxidized via an air blowing process. The softening point (° F.) as measured according to ASTM D36, the penetration point (dmm) at 77° F. as measured according to ASTM D5, and the viscosity (cP) as measured according to ASTM D4402 using a RV3 viscometer spindle at 50 rpm and 400° F. for the resulting oxidized asphalt composition is presented in Table 1 as Sample D.

EXAMPLE 5

Sample E. A rubber composition containing 30 mesh ground tire rubber and devulcanized rubber at a weight ratio of 1:2 was mixed with Unoxidized Asphalt E to obtain an unoxidized asphalt composition. The unoxidized asphalt composition included 96.4% by weight of the Unoxidized Asphalt E and 3.6% by weight of the rubber composition. The weight percentages are based on a total weight of the unoxidized asphalt composition. The unoxidized asphalt composition was oxidized via an air blowing process. The softening point (° F.) as measured according to ASTM D36, the penetration point (dmm) at 77° F. as measured according to ASTM D5, and the viscosity (cP) as measured according to ASTM D4402 using a RV3 viscometer spindle at 50 rpm and 400° F. for the resulting oxidized asphalt composition is presented in Table 1 as Sample E.

TABLE 1

| | Softening Point (° F.) | Penetration Point (dmm) | Viscosity (cP) | Durability |
|---|---|---|---|---|
| Sample A | 217 | 13.3 | 485 | Pass |
| Sample B | 212 | 15.3 | 284 | Pass |
| Sample C | 211 | 17 | 274 | Pass |
| Sample D | 213 | 15.7 | 321 | Fail |
| Sample E | 214 | 17.3 | 336 | Pass |

By oxidizing the unoxidized asphalt composition, the particle size of the ground tire rubber and the devulcanized rubber was reduced, which increased the surface area so as to expose the non-vulcanized sites for reaction. The oxidization process released oils in ground tire rubber that reduced the viscosity of the unoxidized asphalt composition which improved resistance to oxidative aging and enhanced durability due to fine particle reinforcement. Based on the data presented in Table 1, asphalt not suitable for use due to unsatisfactory penetration point and unsatisfactory durability can be combined with ground tire rubber and devulcanized rubber and oxidized to obtain an oxidized asphalt composition useful for roofing applications.

EXAMPLE 6

Sample F. A rubber composition containing 30 mesh ground tire rubber and devulcanized rubber at a weight ratio of 2:1 was mixed with Unoxidized Asphalt F to obtain an unoxidized asphalt composition. The unoxidized asphalt composition included 84% by weight of the Unoxidized Asphalt F and 16% by weight of the rubber composition. The weight percentages are based on a total weight of the unoxidized asphalt composition. The unoxidized asphalt composition was oxidized via an air blowing process. The softening point (° F.) as measured according to ASTM D36, the penetration point (dmm) at 77° F. as measured according to ASTM D5, and the viscosity (cP) as measured according to ASTM D4402 using a RV3 viscometer spindle at 50 rpm and 400° F. for the resulting oxidized asphalt composition are presented in Table 2 as Sample F.

EXAMPLE 7

Sample G. A rubber composition containing 30 mesh ground tire rubber and devulcanized rubber at a weight ratio of 2:1 was mixed with Unoxidized Asphalt G to obtain an unoxidized asphalt composition. The unoxidized asphalt composition included 84% by weight of the Unoxidized Asphalt G and 16% by weight of the rubber composition. The weight percentages are based on a total weight of the unoxidized asphalt composition. The unoxidized asphalt composition was oxidized via an air blowing process. The softening point (° F.) as measured according to ASTM D36, the penetration point (dmm) at 77° F. as measured according to ASTM D5, and the viscosity (cP) as measured according to ASTM D4402 using a RV3 viscometer spindle at 50 rpm and 400° F. for the resulting oxidized asphalt composition are presented in Table 2 as Sample G.

EXAMPLE 8

Sample H. A rubber composition containing 30 mesh ground tire rubber was mixed with Unoxidized Asphalt H to obtain an unoxidized asphalt composition. The unoxidized asphalt composition included 90% by weight of the Unoxidized Asphalt H and 10% by weight of the rubber composition. The weight percentages are based on a total weight of the unoxidized asphalt composition. The unoxidized asphalt composition was oxidized via an air blowing process. The softening point (° F.) as measured according to ASTM D36, the penetration point (dmm) at 77° F. as measured according to ASTM D5, and the viscosity (cP) as measured according to ASTM D4402 using a RV3 viscometer spindle at 50 rpm and 400° F. for the resulting oxidized asphalt composition are presented in Table 2 as Sample H. The oxidized asphalt composition was evaluated for degree of separation of asphalt from the rubber composition after 24 hours. No separation of the asphalt from the rubber composition was detected after the 24 hours.

TABLE 2

| | Softening Point (° F.) | Penetration Point (dmm) | Viscosity (cP) | Durability |
|---|---|---|---|---|
| Sample F | 210 | 20 | 383 | Pass |
| Sample G | 208 | 25 | 277 | Pass |
| Sample H | 213 | 18 | 374 | Pass |

EXAMPLE 9

Each of Sample A to Sample H is separately mixed with a limestone filler to obtain an asphalt filled coating having 10% to 90% by weight of the limestone filler, and 10% to 90% by weight of the oxidized asphalt composition. Each asphalt filled coating is applied to a coated coupon. The physical properties of the coated coupons are measured to evaluate the performance of the asphalt filled coatings in roofing applications. Each of the coated coupons exhibit a tensile strength, a tear strength, and an elastic recovery that is either suitable or superior (relative to conventional asphalt filled coatings without the rubber compositions) and thus the asphalt filled coatings are determined to be useful for roofing applications, including, without limitation, roofing shingles. The process for preparing the coated coupons is performed on a standard manufacturing line for roofing shingles. All percentages by weight are based on a total weight of the asphalt filled coating.

What is claimed is:

1. A method comprising:
    obtaining a rubber component,
        wherein the rubber component comprises at least one of ground tire rubber, devulcanized rubber, or any combination thereof;
    obtaining an unoxidized asphalt,
        wherein the unoxidized asphalt having a penetration point of 200 dmm or greater at 77° F. as measured according to ASTM D5;
    mixing the rubber component and the unoxidized asphalt to obtain an unoxidized asphalt composition;
    after the step of mixing, oxidizing the unoxidized asphalt composition to obtain an oxidized asphalt composition,
        wherein the oxidized asphalt composition has a penetration point of 15 dmm to 30 dmm at 77° F. as measured according to ASTM D5; and
    forming a roofing shingle from the oxidized asphalt composition;
    wherein the method does not comprise a step of adding a polymer comprising styrene.

2. The method of claim 1, wherein the rubber component comprises:
    1% to 99% by weight of ground tire rubber based on a total weight of the rubber component; and 1% to 99% by weight of devulcanized rubber based on the total weight of the rubber component.

3. The method of claim 1, wherein the penetration point of the unoxidized asphalt is 200 dmm to 1000 dmm at 77° F. as measured according to ASTM D5.

4. The method of claim 1, wherein the unoxidized asphalt composition comprises:
1% to 50% by weight of the rubber component based on a total weight of the unoxidized asphalt composition; and
50% to 99% by weight of the unoxidized asphalt based on the total weight of the unoxidized asphalt composition.

5. The method of claim 1, wherein the unoxidized asphalt and the rubber component are mixed at a temperature of 300° F. to 425° F.

6. The method of claim 1, wherein the unoxidized asphalt composition is oxidized at a temperature of 200° F. to 600° F.

7. The method of claim 1, wherein the oxidized asphalt composition has a softening point of 180° F. to 235° F. as measured according to ASTM D36.

8. The method of claim 1, wherein the oxidized asphalt composition has a viscosity of 100 cP to 500 cP as measured according to ASTM D4402 using a RV3 viscometer spindle at 50 rpm and 400° F.

9. The method of claim 1, wherein the oxidized asphalt composition comprises:
1% to 50% by weight of the rubber component based on a total weight of the oxidized asphalt composition; and
50% to 99% by weight of an asphalt based on the total weight of the oxidized asphalt composition.

10. A method comprising:
obtaining a rubber component,
wherein the rubber component comprises at least one of ground tire rubber, devulcanized rubber, or any combination thereof;
obtaining an unoxidized asphalt,
wherein the unoxidized asphalt having a penetration point of 200 dmm or greater at 77° F. as measured according to ASTM D5;
mixing the rubber component and the unoxidized asphalt to obtain an unoxidized asphalt composition;
after the step of mixing, oxidizing the unoxidized asphalt composition to obtain an oxidized asphalt composition,
wherein the oxidized asphalt composition has a softening point of 180° F. to 235° F. as measured according to ASTM D36; and
forming a roofing shingle from the oxidized asphalt composition;
wherein the method does not comprise a step of adding a polymer comprising styrene.

11. The method of claim 10, wherein the rubber component comprises:
1% to 99% by weight of ground tire rubber based on a total weight of the rubber component; and
1% to 99% by weight of devulcanized rubber based on the total weight of the rubber component.

12. The method of claim 10, wherein the penetration point of the unoxidized asphalt is 200 dmm to 1000 dmm at 77° F. as measured according to ASTM D5.

13. The method of claim 10, wherein the unoxidized asphalt composition comprises:
1% to 50% by weight of the rubber component based on a total weight of the unoxidized asphalt composition; and
50% to 99% by weight of the unoxidized asphalt based on the total weight of the unoxidized asphalt composition.

14. The method of claim 10, wherein the unoxidized asphalt and the rubber component are mixed at a temperature of 300° F. to 425° F.

15. The method of claim 10, wherein the unoxidized asphalt composition is oxidized at a temperature of 200° F. to 600° F.

16. The method of claim 10, wherein the oxidized asphalt composition has a penetration point of 15 dmm to 30 dmm at 77° F. as measured according to ASTM D5.

17. The method of claim 10, wherein the oxidized asphalt composition has a viscosity of 100 cP to 500 cP as measured according to ASTM D4402 using a RV3 viscometer spindle at 50 rpm and 400° F.

18. The method of claim 10, wherein the oxidized asphalt composition comprises:
1% to 50% by weight of the rubber component based on a total weight of the oxidized asphalt composition; and
50% to 99% by weight of an asphalt based on the total weight of the oxidized asphalt composition.

* * * * *